US010119631B2

United States Patent
Toll et al.

(10) Patent No.: US 10,119,631 B2
(45) Date of Patent: Nov. 6, 2018

(54) ADJUSTABLE P-CLAMP

(71) Applicant: HellermannTyton Corporation, Milwaukee, WI (US)

(72) Inventors: Michael Toll, Whitefish Bay, WI (US); Gerard G. Geiger, Jackson, WI (US); Christopher J. Rohde, West Allis, WI (US); Jonathan Zick, Waukesha, WI (US); Walter Patrick Trautfield, Milwaukee, WI (US)

(73) Assignee: HELLERMANNTYTON CORPORATION, Milwaukee, WI (US)

(*) Notice: Subject to any disclaimer, the term of this patent is extended or adjusted under 35 U.S.C. 154(b) by 0 days.

(21) Appl. No.: 15/423,419

(22) Filed: Feb. 2, 2017

(65) Prior Publication Data
US 2017/0227141 A1    Aug. 10, 2017

Related U.S. Application Data

(60) Provisional application No. 62/291,965, filed on Feb. 5, 2016.

(51) Int. Cl.
| | |
|---|---|
| F16L 3/10 | (2006.01) |
| F16L 3/23 | (2006.01) |
| F16L 3/233 | (2006.01) |
| F16L 3/237 | (2006.01) |
| F16B 11/00 | (2006.01) |
| F16L 3/12 | (2006.01) |
| F16L 3/13 | (2006.01) |

(52) U.S. Cl.
CPC .......... *F16L 3/1075* (2013.01); *F16B 11/006* (2013.01); *F16L 3/10* (2013.01); *F16L 3/1033* (2013.01); *F16L 3/1058* (2013.01); *F16L 3/12* (2013.01); *F16L 3/1222* (2013.01); *F16L 3/13* (2013.01); *F16L 3/23* (2013.01); *F16L 3/237* (2013.01); *F16L 3/2336* (2013.01)

(58) Field of Classification Search
CPC ......... F16L 3/1033; F16L 3/1075; F16L 3/13; F16L 3/1222; F16L 3/10; F16L 3/12; F16L 3/2336
See application file for complete search history.

(56) References Cited

U.S. PATENT DOCUMENTS

| | | | |
|---|---|---|---|
| 4,264,047 A | 4/1981 | Nelson | |
| 5,305,978 A * | 4/1994 | Current | F16L 3/1075 248/230.4 |
| 5,367,750 A | 11/1994 | Ward | |

(Continued)

FOREIGN PATENT DOCUMENTS

| | | | | |
|---|---|---|---|---|
| DE | 19856945 C1 * | 6/2000 | ............ | F16L 3/1075 |
| DE | 102006025706 A1 * | 12/2007 | ............. | F01N 13/00 |

(Continued)

*Primary Examiner* — Eret C McNichols
(74) *Attorney, Agent, or Firm* — Robert J. Myers

(57) ABSTRACT

A P-clamp assembly and method to secure elongate items, such as wires, cables and the like into bundles and to further secure the bundles a support structure. The assembly includes an integrally formed clamp member and a mount element. The clamp member includes a pair of substantially symmetrical, locking arcuate members that includes a hinge mechanism.

9 Claims, 19 Drawing Sheets

(56) References Cited

U.S. PATENT DOCUMENTS

| | | | | | |
|---|---|---|---|---|---|
| 5,937,488 | A | * | 8/1999 | Geiger | F16L 3/1033 24/16 PB |
| 6,809,257 | B2 | * | 10/2004 | Shibuya | B60R 16/0215 174/135 |
| 7,661,631 | B2 | * | 2/2010 | Ibaraki | F16L 3/1025 248/68.1 |
| 7,887,012 | B2 | * | 2/2011 | Desai | F16L 3/1075 24/530 |
| 8,020,812 | B2 | * | 9/2011 | Matsuno | F16L 3/1075 24/336 |
| 8,967,556 | B2 | * | 3/2015 | Meyers | F16L 3/2235 248/60 |
| 2010/0207001 | A1 | * | 8/2010 | Smith | F16L 3/1075 248/230.4 |
| 2013/0001373 | A1 | * | 1/2013 | Ogawa | F16L 3/1041 248/65 |
| 2014/0151514 | A1 | * | 6/2014 | Asai | B60R 16/0215 248/74.1 |
| 2016/0114743 | A1 | * | 4/2016 | Miyamoto | F16L 3/1075 224/557 |
| 2017/0146154 | A1 | * | 5/2017 | Tally | F16L 3/1075 |
| 2017/0297516 | A1 | * | 10/2017 | Loebe | F16L 3/1075 |

FOREIGN PATENT DOCUMENTS

| | | | | | |
|---|---|---|---|---|---|
| DE | 102009034546 | A1 | * | 7/2011 | F16L 3/1075 |
| EP | 0069223 | A1 | | 1/1983 | |
| EP | 2058242 | A1 | | 5/2009 | |
| EP | 2141397 | A1 | | 1/2010 | |
| JP | 2014108032 | A | * | 6/2014 | B60R 16/0215 |

* cited by examiner

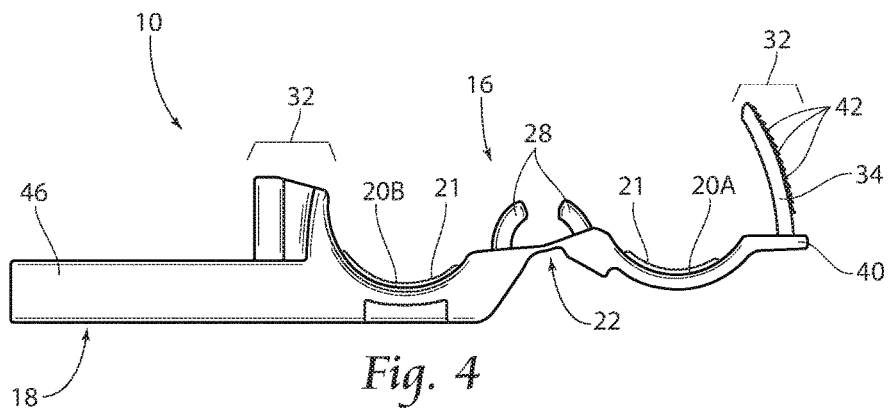
*Fig. 4*
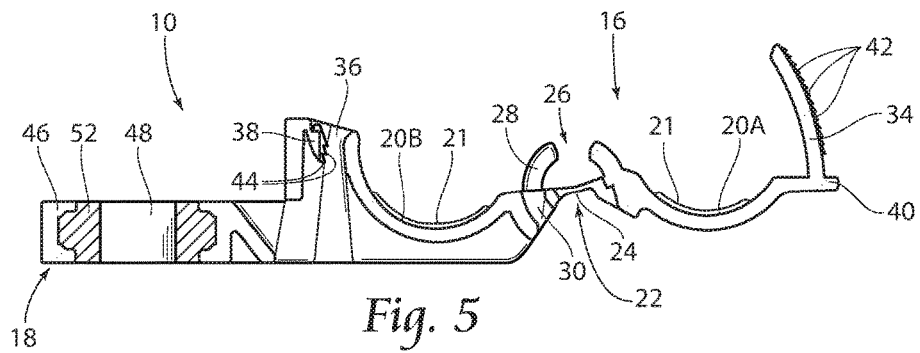
*Fig. 5*
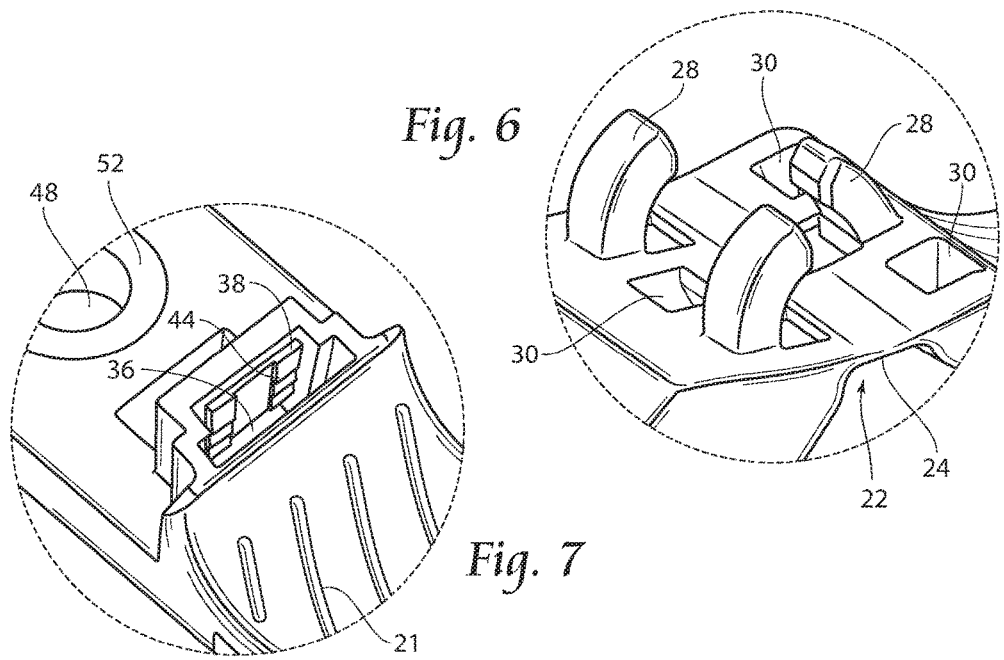
*Fig. 6*
*Fig. 7*

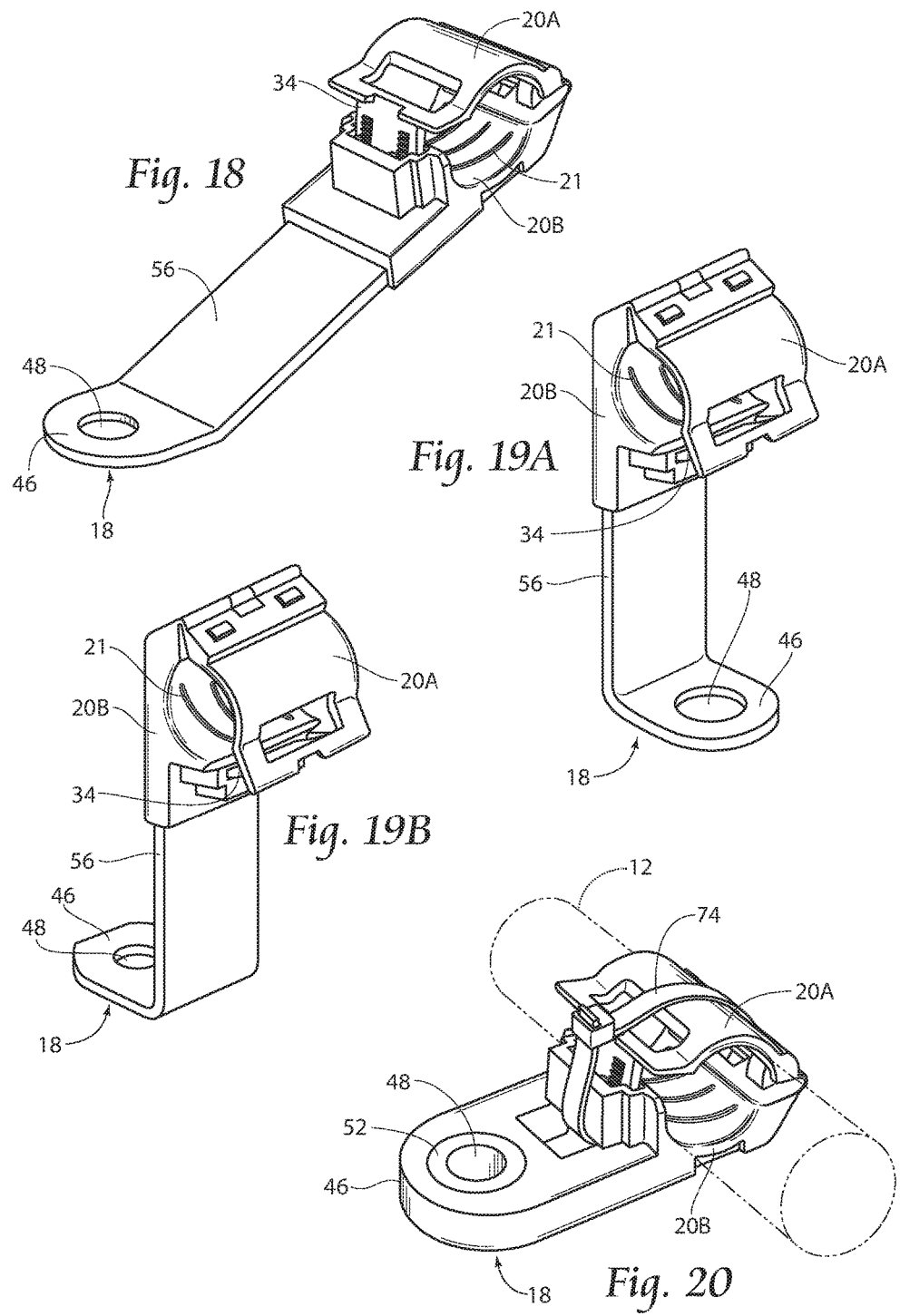

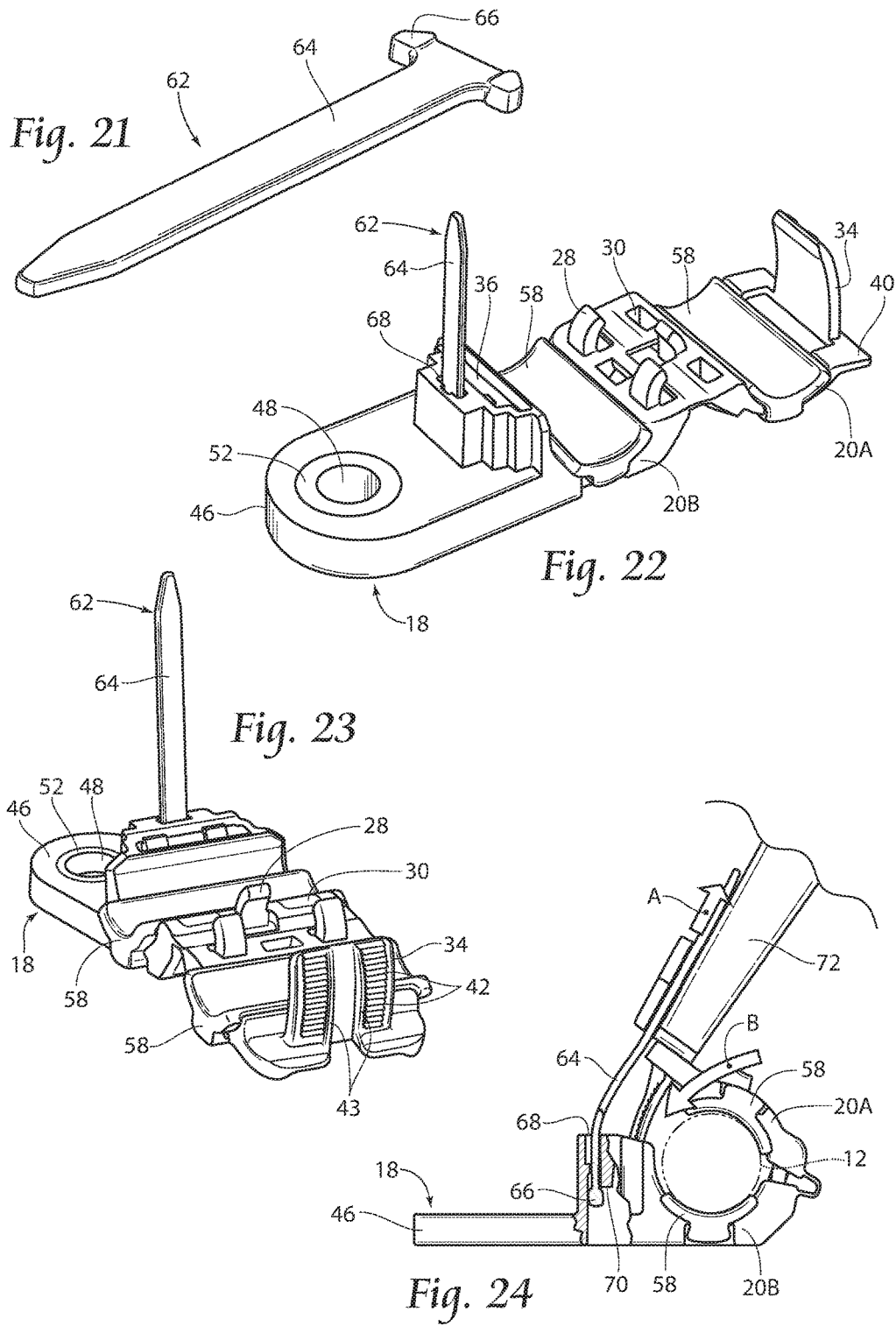

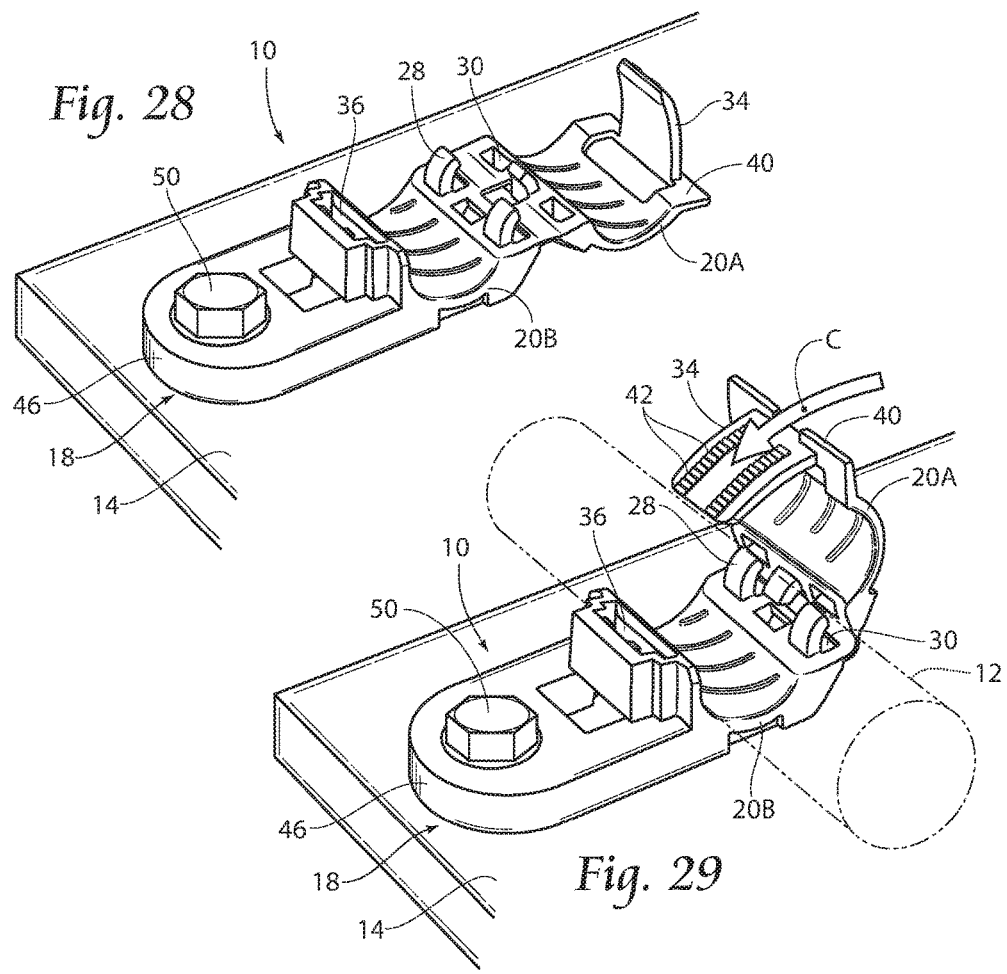
Fig. 28
Fig. 29
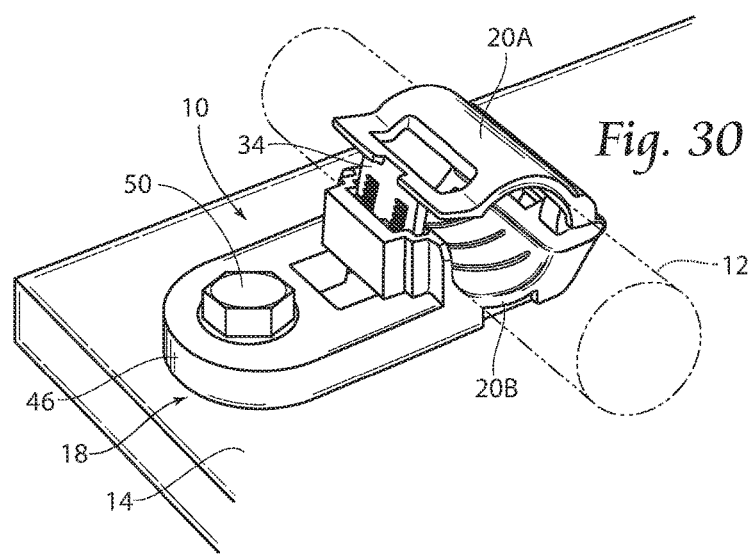
Fig. 30

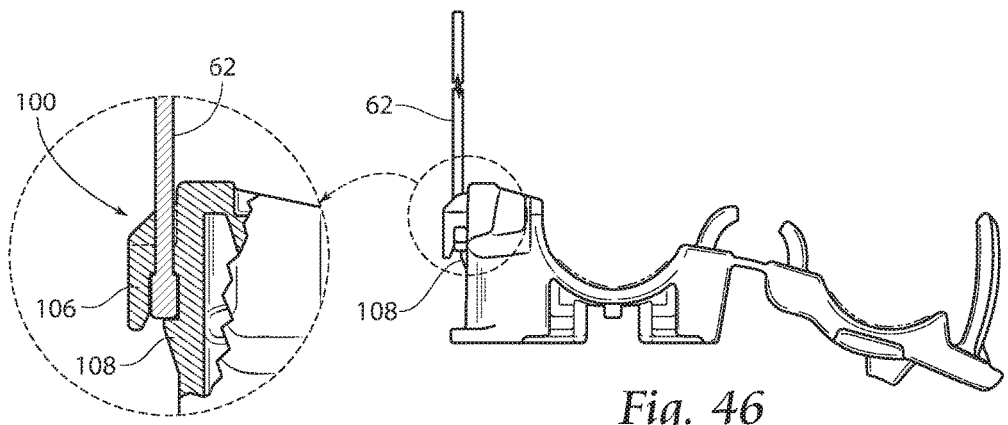
Fig. 46A
Fig. 46
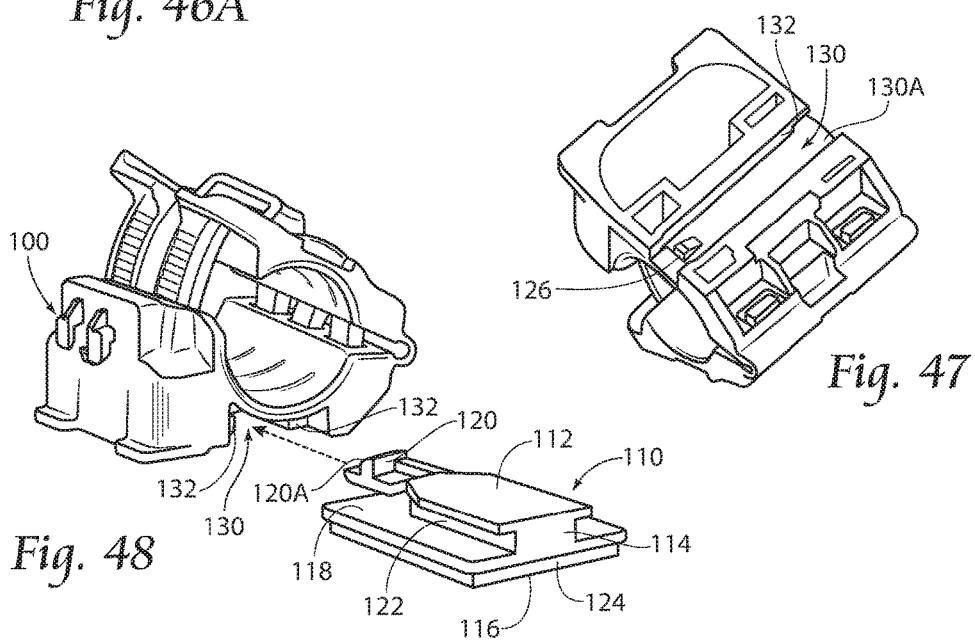
Fig. 47
Fig. 48
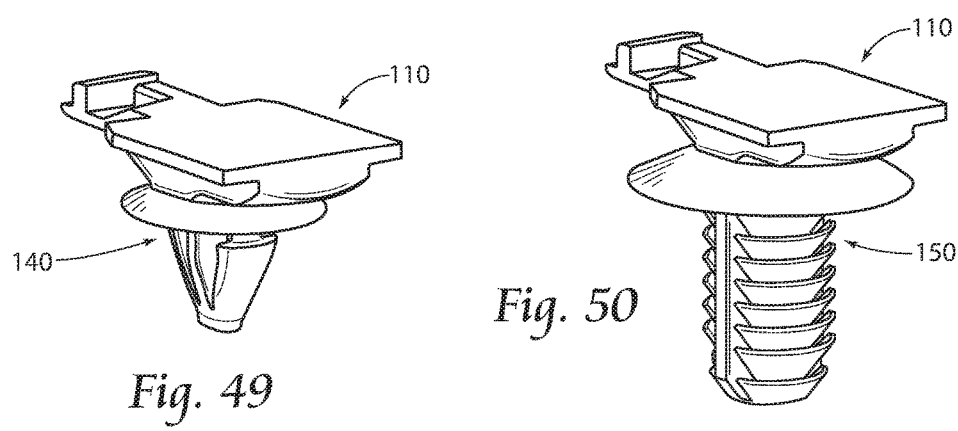
Fig. 49
Fig. 50

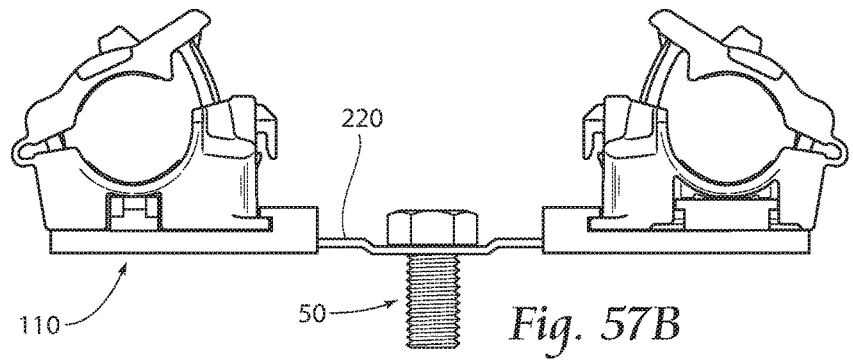
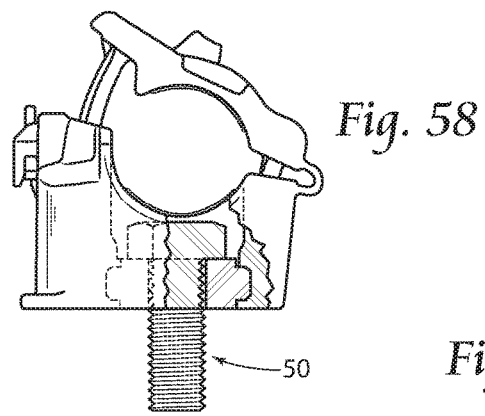
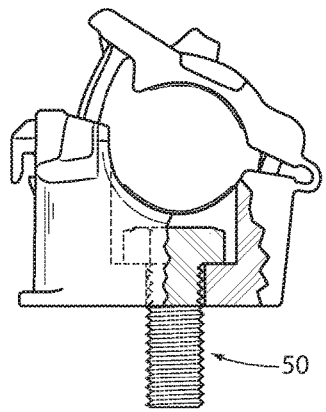
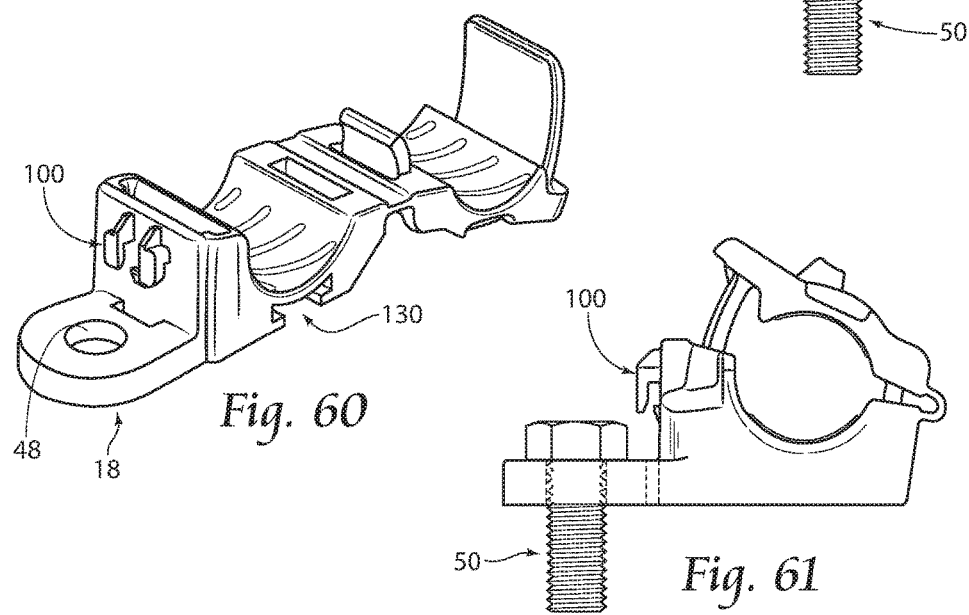

ADJUSTABLE P-CLAMP

RELATED APPLICATION

This application claims the benefit of U.S. Provisional Patent Application Ser. No. 62/291,965, filed 5 Feb. 2016.

BACKGROUND OF THE INVENTION

Clamps, such as p-clamps are often used to secure elongate items in bundles and to further secure bundled elongate items to support surfaces. In many applications, it is sufficient merely to secure the items into a bundle. Such applications might include, for example, stationary electronic equipment that remains in one place and is subject to little or no vibration in use. In other applications, it is necessary or desirable not only to secure the items into a bundle, but to secure the resulting bundle to a support, surface, chassis or framework as well. Such applications are also common, for example, in cars, trucks, airplanes, ships, boats and other vehicles where the bundle is likely to be subjected to severe jostling and vibration. In other applications (e.g. buildings), where vibration might not be an important consideration, it is still desirable to secure cables, hoses, tubes, etc., to a fixed structure.

Plastic clips and clamps of various types have been developed to simplify and speed manufacturing operations. Appropriately designed clips and clamps can often be used in place of traditional brackets, nuts, bolts and washers. Frequently, it is easier and faster to use an appropriately designed plastic clips or p-clamps to secure one item to another than it is to use a bracket, nut and bolt. It is often more economical as well, particularly in high volume situations where the cost of initial design and tooling is amortized over a large number of pieces.

Known p-clamps may exhibit certain shortcomings. For example, clamps made of metal may twist and bend when in application. Coating on known clamps may wear away and cause the surfaces of secured bundled items to abrade. Moreover, known clamps may not be easily opened to release the bundled item, and the clamp may be damaged during removal. Further, known clamps may be difficult to install in awkward or unusual application environments requiring the user to maintain a large clamp inventory to ensure a clamp for each installment circumstance. Additionally, depending on the nature of the elongate items, the clamps may be required to withstand harsh environments, such as dirt, debris, UV exposure, or heavy vibration, for example. Clamps may fail when subjected to such conditions. Thus there is a need for a p-clamp which is able to fulfill many requirements simultaneously, to hold and secure elongate articles while withstanding a range of conditions and further provide facile release when desired.

SUMMARY OF THE INVENTION

The present invention relates generally to retaining mechanisms. Particularly, the present invention is directed to a side-locking clamp assembly, or "p-clamp" and method of use. A locking clamp assembly according to the present invention may be used to secure elongate objects, such as bundled wires, cables, hoses, tubing, fiber optics, conduits, vines, etc., to a supporting structure. More particularly, the invention relates to a releasable p-clamp assembly having a mounting element for securing elongated articles held by the clamp to a support surface.

A clamp assembly according to the present invention includes a clamp member having a pair of substantially symmetrical locking arcuate members. The arcuate members are shaped and dimensioned to encircle an elongate element and are joined by a hinge mechanism. The hinge mechanism includes an area of reduced thickness which allows the hinge to move freely during installation and securing of an elongate article. The hinge mechanism for use with the present invention may also include a hinge interlocking mechanism which comprises at least one arcuate projection that is configured to be received into a corresponding channel. When the arcuate members are secured around an elongate article, as will be described, the interaction of the interlocking arcuate projection in the channel retains the clamp in a closed position should the area of reduced thickness fail, due to cracking or other loss.

The clamp member further preferably includes a lock mechanism comprised of a tongue and engaging pawl. The distal end of a first arcuate member may include an extending tongue member, with a slotted opening being positioned adjacent a second arcuate member. The tongue member is molded having a plurality of serrations, which extend along the length of the tongue and across the width of the tongue. The serrations may be arranged in one or two parallel rows. The tongue member is adapted to be received in a corresponding slotted opening adjacent the second arcuate member. A wedge-shaped pawl is located in the slotted opening and includes teeth thereon. The teeth may be arranged in one or two parallel rows to correspond to the width of the serrations on the tongue. The serrations engage with the teeth on the wedge shaped pawl when the tongue is inserted into the slot opening for locking.

As mentioned, a clamp according to the present invention preferably includes a mounting element for securing the clamp-restrained elongated articles to a support surface. The mounting element includes an extending tab mount member having a mounting aperture therein. The mounting aperture is sized and dimensioned to receive attachment means, such as a bolt, screw, or other known device, to thereby attach the clamp assembly to a primary supporting member. The mounting element may be integrally formed with the clamp member or may be over molded with the clamp member, and may or may not include an aperture reinforcement member, as may be desired by the specific application. Moreover, the mounting tab may be planar or angled.

The present assembly may also be used in conjunction with a tension tab. A tension tab for use with the present invention may comprise an elongate strap portion and a head portion. A tension tab may be used to aid a user in closing the arcuate members around an elongate object and applying proper tension of the arcuate members around the elongate member. In use, the tension tab is inserted in a tension tab aperture, the head is stopped against an abutment in the tension tab aperture, while the strap extends therefrom. To close the arcuate members around the elongate object, the user may press down on the first arcuate member to move the tongue into the slot, or may use a handheld tensioning device to grasp the tension tab strap. The handheld device may be actuated to pull the strap while pushing against the first arcuate member to thereby close the arcuate members with a predetermined tension.

A clamp assembly according to the present invention may further comprise a pair of spaced apart clamp members. Moreover, the clamp apparatus may include use of known flexible cable ties such as those to secure elongate items, such as wires, cables, hoses and tubes, into compact, secure bundles. Typically, such ties include a head and a flexible strap, which terminates in a tail. During standard use of such flexible cable ties, the tail is inserted through the head or slotted opening of a mount, and then looped around the elongate item. The tail is then pulled tight to pull the strap around the articles, and thereby secure the articles into a compact, neat bundle. A pawl mechanism within the head secures the strap against withdrawal. The present apparatus may interact with such a flexible tie to further secure the clamp in a closed position.

BRIEF DESCRIPTION OF THE DRAWINGS

FIG. 4 is a side elevation view of the assembly shown in FIGS. 2 and 3.

FIG. 5 is a cross section view of the assembly illustrated in FIGS. 2-4 and taken along lines 5-5 of FIG. 3.

FIG. 6 is a fragmentary enlarged view of the assembly illustrated in FIGS. 2-5 and showing the hinge portion.

FIG. 7 is a fragmentary enlarged view of the clamp illustrated in FIGS. 2-5 and showing the locking pawls.

FIG. 18 is a perspective view of an assembly, similar to that shown in FIG. 17, but showing a fastening tab having an extended and angled portion.

FIG. 19A is a perspective view of an assembly, similar to that shown in FIGS. 15, and 18, but showing the fastening tab having an extended arm portion and an angled portion extending at a 90° angle in a first direction.

FIG. 19B is a perspective view of an assembly, similar to that shown in FIGS. 15, 17 and 18, but showing the fastening tab having an extended arm portion and an angled portion extending at a 90° angle in a second direction.

FIG. 20 is a view similar to that of FIG. 9, but showing a cable tie further securing the clamp in a closed position.

FIG. 21 is a perspective view of a tension tab for use with the present invention.

FIG. 22 is a view similar to that of FIG. 12, but showing a tension tab mount and a tension tab in place for use.

FIG. 23 is a front perspective view of the assembly and tension cab illustrated in FIG. 22 and showing an elongate groove to guide the tension tab.

FIG. 24 is a partial cut away side view of the assembly and tension tab illustrated in FIGS. 22 and 12, but showing the tension tab being tightened by a hand held device.

FIG. 28 is a view similar to that of FIG. 27, but showing the assembly secured to a support surface and ready to receive an elongate object.

FIG. 29 is a view similar to that of FIGS. 27 and 28 but showing the assembly secured to a support surface and the p-clamp being positioned for fastening around an elongate object.

FIG. 30 is a view similar to that of FIGS. 27-29, but showing the p-clamp fastened around an elongate object.

FIG. 46 is a side view showing a tension tab lock and tension tab illustrated in FIG. 45.

FIG. 46A is an enlarged view showing a portion of FIG. 46 with a tension tab lock and tension tab.

FIG. 47 is a bottom perspective view of FIG. 45 showing a mounting insert channel.

FIG. 48 is a perspective view showing an assembly as illustrated in FIGS. 45-46, but showing the mounting insert as it is to be positioned in the insert channel.

FIG. 49 is a perspective view of a variation of the mounting insert as illustrated in FIG. 48, configured with a mounting arrowhead.

FIG. 50 is a perspective view of a variation of the mounting insert as illustrated in FIG. 48, configured with a mounting fir tree.

FIG. 57B is a front elevation view of FIG. 57A, showing two assemblies as illustrated in FIG. 45 affixed with the mounting inserts positioned in the mounting channels and a bolt positioned in the mounting aperture.

FIG. 58 is a side elevation view of a mounting assembly as illustrated in FIGS. 56A-56B with showing a partial sectional view of the mounting insert positioned in the mounting channel as well as the bolt positioned in the mounting aperture.

FIG. 59 is a side elevation view of a mounting assembly as illustrated in FIGS. 57A-57B with showing a partial sectional view of the mounting insert positioned in the mounting channel as well as the bolt positioned in the mounting aperture.

FIG. 60 is a perspective view of a variation of the P-clamp shown in FIG. 45 view showing a tension tab lock and tension tab illustrated in FIG. 45, but showing a mounting aperture to receive a bolt.

FIG. 61 is a side view of FIG. 60, showing a bolt positioned in the mounting aperture.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 27:
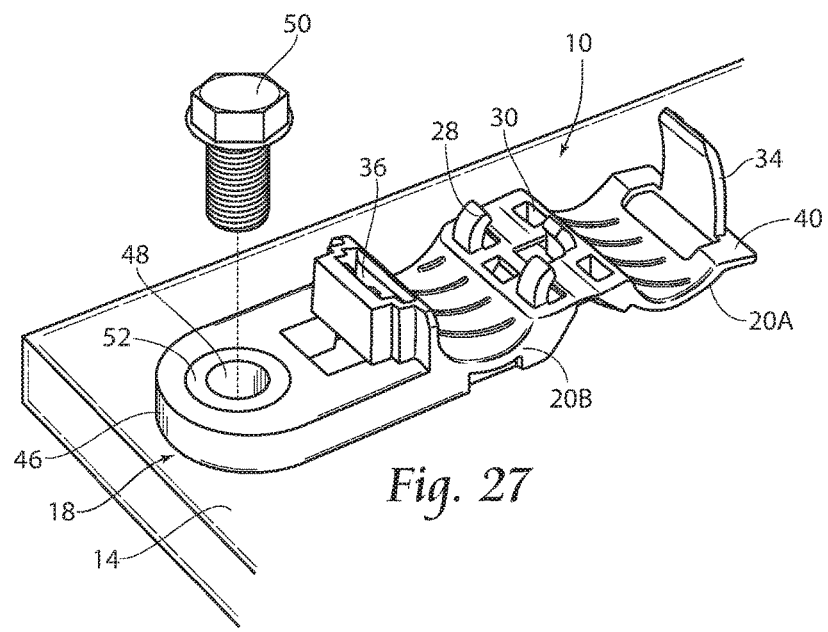
FIG. 27 is a perspective view of an assembly similar to that illustrated in FIG. 2, but showing a bolt fastening the assembly to a support surface.
Figure 31:
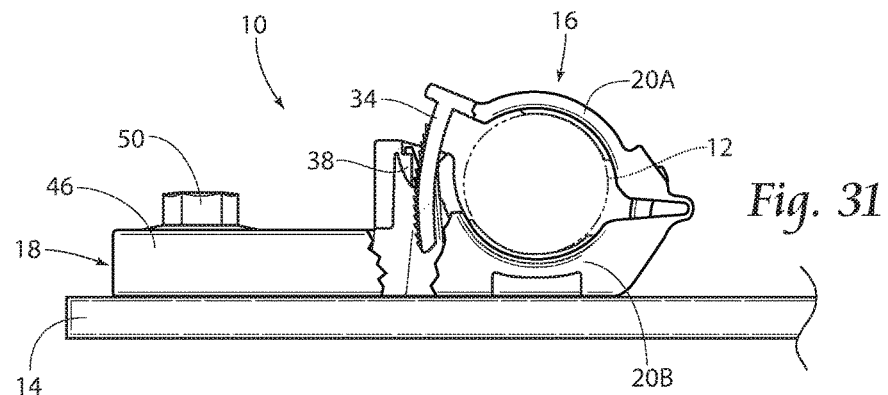
FIG. 31 is a partially cut away side elevation view of the assembly illustrated in FIG. 30 and showing a locking mechanism securing the p-clamp around an elongate object.

Referring to the drawings and in particular to FIGS. 2-9, inclusive, a clamp assembly 10 embodying the various features of the invention is shown. The assembly 10 functions to secure elongate items, such as wires, cables and the like into bundles 12 (shown in phantom) and to further secure the bundles 12 to an adjacent support structure 14 (see FIG. 27 for example). It will be apparent that the bundle 12 may comprise a single object or several objects, such as wires, conduits, or cables that are flexible or rigid, hot or cold, or fluid transporting hoses or tubes. Some elongate items may also be contained within the bore of a conventional tubular conduit. The assembly 10 is particularly well suited for use in applications requiring releasable clamping while the assembly 10 is attached to a support structure 14.

Figure 1:
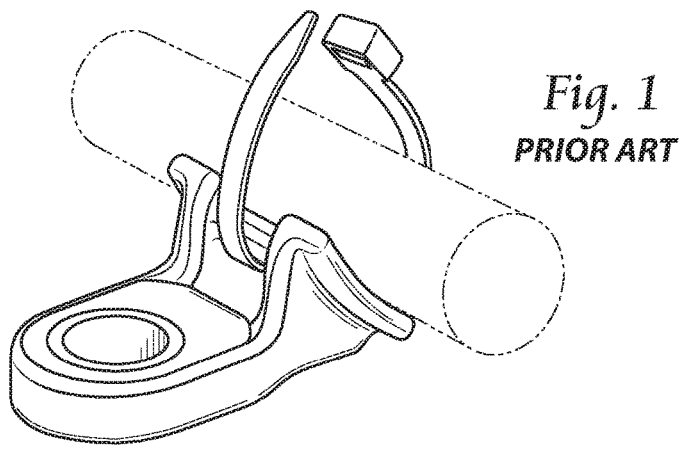
FIG. 1 is a perspective view of a prior art p-clamp.
Figure 2:
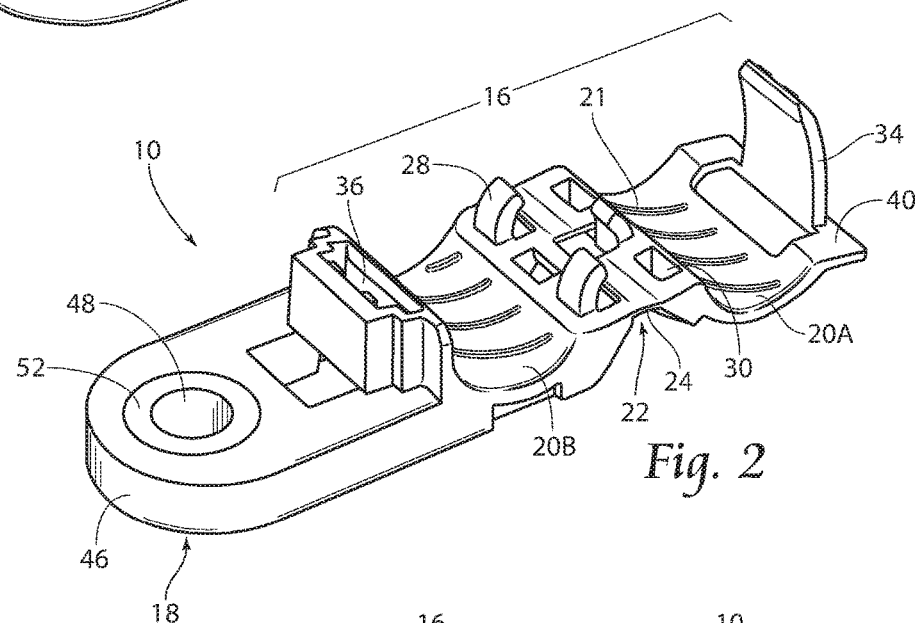
FIG. 2 is a perspective view of a p-clamp assembly according to the present invention.
Figure 3:
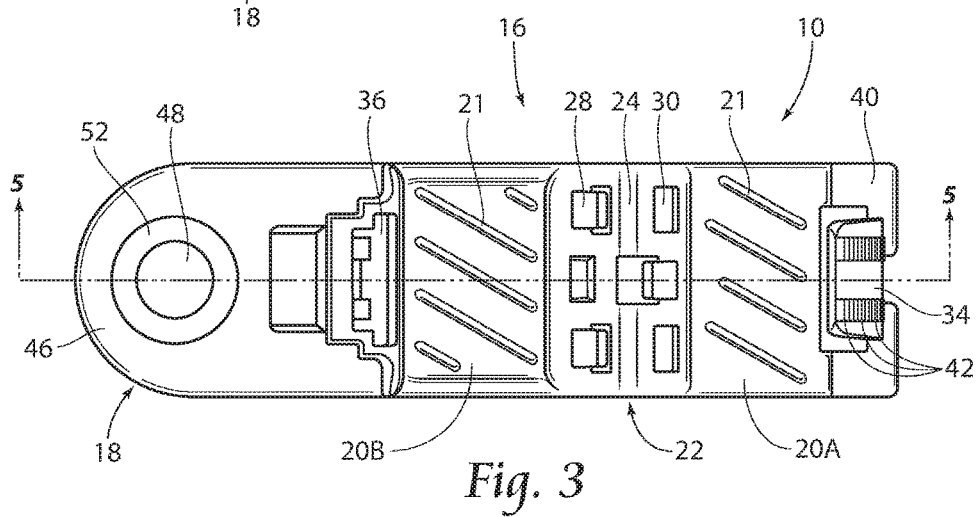
FIG. 3 is a top view of the assembly illustrated in FIG. 2.

As illustrated in the view of FIG. 2, the assembly 10 includes two principal components, namely an integrally formed clamp member 16 and a mount element 18. The clamp member 16 includes a pair of substantially symmetrical, locking arcuate members 20A, 20B. The arcuate members 20A, 20B are shaped and dimensioned to encircle an elongate element, such as a bundle 12 and are joined by a hinge mechanism 22. The arcuate members 20A, 20B may further include ridges 21. The ridges 21 aid in securing a bundle 12 within the clamp member 16 and help prevent unwanted rotation of the bundle 12 during vibration or other movement of the assembly 10. Alternatively, the arcuate members 20A, 20B may include a cradle member 58, as will be discussed with reference to FIGS. 10-12. As may be seen in FIG. 4, the hinge mechanism 22 may include an area of reduced thickness 24 which allows the hinge mechanism 22 to move freely during the installation and securing of an elongate article 12.

With specific reference to FIGS. 5 and 6, it may be seen that the hinge mechanism 22 may also include a hinge interlocking mechanism 26. As shown, the interlocking mechanism 26 comprises at least one arcuate projection 28 that is configured to be received into a corresponding channel 30. When the clamp member 16 is engaged, and the arcuate members 20A, 20B are closed around an elongate article 12, as will be described, the interaction of the interlocking arcuate projection 28 in the channel 30 retains the arcuate members 20A, 20B in a closed position should the area of reduced thickness 24 fail, due to cracking or other loss.

Figure 8:
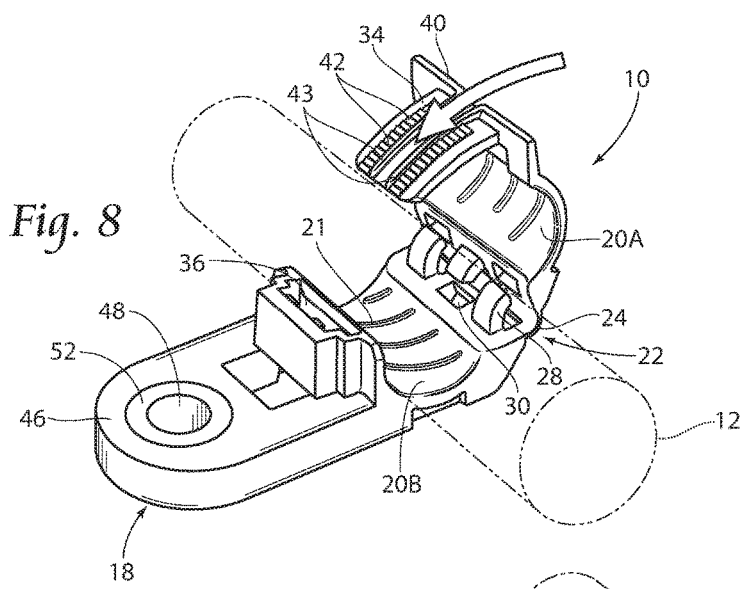
FIG. 8 is a view similar to that of FIG. 2, but showing the clamp being positioned for fastening around an elongate object.
Figure 9:
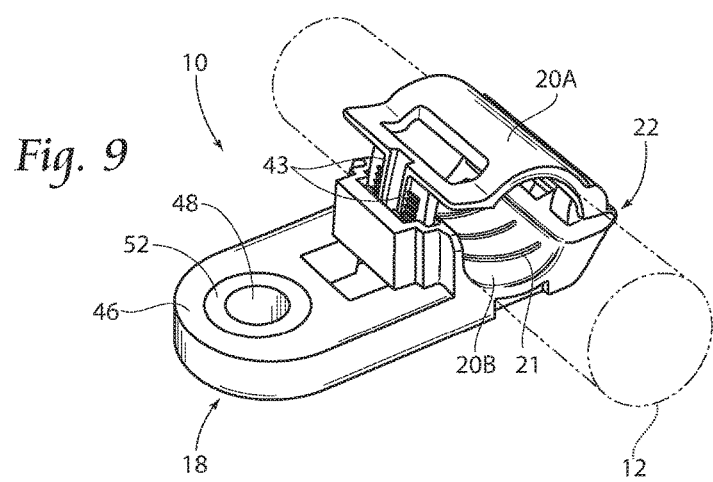
FIG. 9 is a view similar to that of FIG. 8, but showing the clamp fastened around an elongate object.

As is illustrated in FIGS. 4, 5, 7, and 8, the clamp member 16 may be seen to further include a lock mechanism 32. The lock mechanism 32 is comprised of a tongue 34 and a slot opening 36 having an engaging pawl 38 (see particularly FIGS. 5 and 7). As shown, the distal end 40 of a first arcuate member 20A may include an extending tongue member 34, with a slot opening 36 being positioned adjacent a second arcuate member 20B. The tongue member 34 is preferably molded with a plurality of serrations 42, which extend along the length of the tongue 34 and across the width of the tongue 34. The serrations 42 may be arranged in two parallel rows as shown. The tongue member 34 is adapted to be received in a corresponding slotted opening 36 adjacent the second arcuate member 20B. As may be seen particularly in FIGS. 5 and 7, the wedge-shaped pawl 38 located in the slotted opening 36 may include teeth 44 thereon. The teeth 44 may be arranged in two parallel rows to correspond to the width of the serrations 42 on the tongue member 34. As illustrated, the serrations 42 engage the teeth 44 on the wedge shaped pawl 38 when the tongue member 34 is inserted into the slot opening 36 for locking. As best shown in FIGS. 8 and 9, the tongue member 34 may further include a pair of spaced apart serration rails 43. The rails 43 serve to protect the serrations 42 from damage from a release tool 76 (see FIG. 32), should opening of the lock mechanism 32 be desired.

Figure 10:
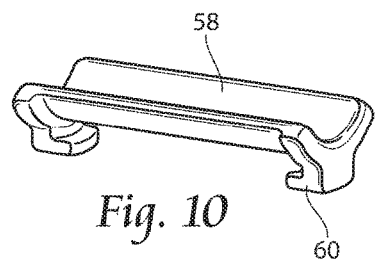
FIG. 10 is a perspective view of a flexible cradle insert.
Figure 11:
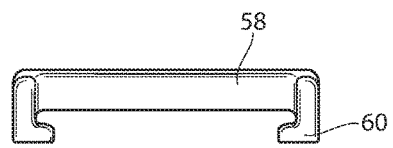
FIG. 11 is a side view of the insert illustrated in FIG. 10.
Figure 12:
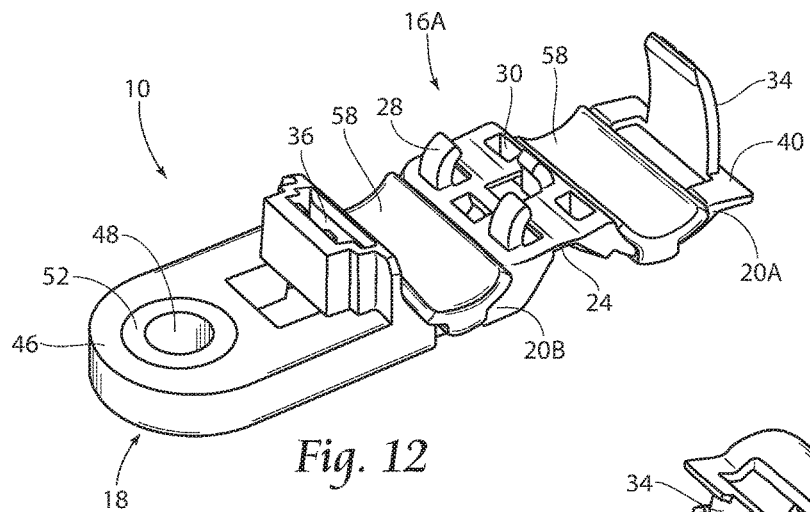
FIG. 12 is a perspective view of an assembly, similar to that of FIG. 2, but showing flexible cradle inserts in place on the clamping portion.

With reference to FIGS. 10-11, a cradle member 58 may be seen. The cradle member 58 is adapted for engagement with respective arcuate members 20A, 20B and to face a secured bundle 12 during use. The cradle member 58 may be fabricated of rubber or other high coefficient of friction material, to thereby provide a gripping force on a secured bundle 12 and to prevent unwanted rotation of a secured bundle 12 in applications during which vibration or other movement of the assembly 10 may occur. The cradle member 58 may include flanges 60 for securement to respective arcuate members 20A, 20B.

Figure 16A:
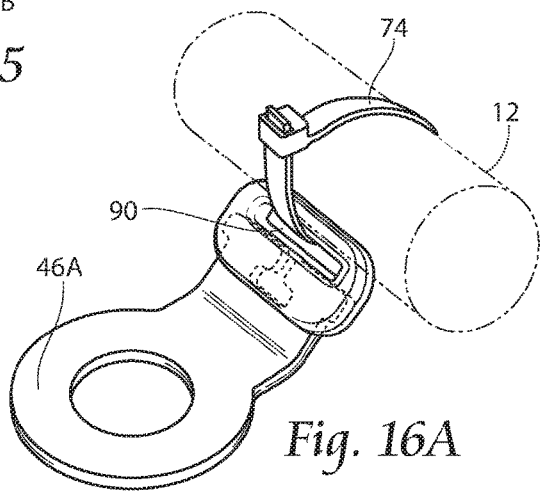
FIG. 16A is a perspective view of an alternative arrangement wherein a metal fastening tab includes a slot to receive a cable tie to secure an elongate object without use of a p-clamp.
Figure 16B:
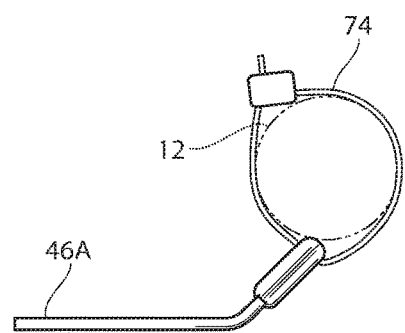
FIG. 16B is a side view of the device shown in FIG. 16A.
Figure 17:
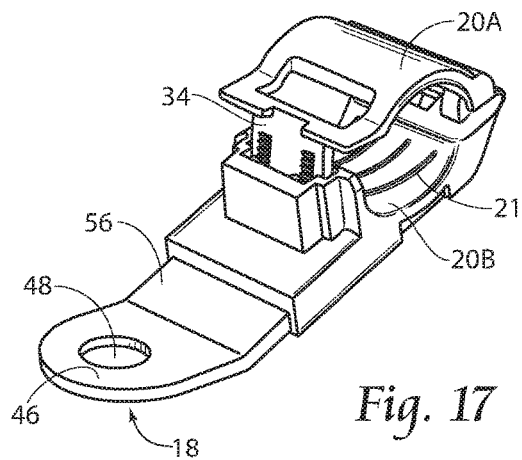
FIG. 17 is a perspective view of an assembly, similar to that shown in FIGS. 13, 14 and 15, but showing a fastening tab having an extended and angled portion.

As mentioned, a clamp assembly 10 according to the present invention further includes a mounting element 18 for securing clamp-restrained elongated articles or bundles 12 to a support structure 14. As seen in the Figures, the mounting element 18 includes an extending tab mount member 46 having a mounting aperture 48 therein. The mounting aperture 48 is preferably sized and dimensioned to receive attachment means, such as the bolt 50 shown (see FIGS. 27-38, although it is to be understood that other attachment means may be used to attach the clamp assembly 10 to a primary supporting structure 14, such as screws, or other known devices). The tab member 46 may be integrally formed with the clamp assembly 10, as is shown in FIGS. 2-13 or may be over molded with the clamp assembly as depicted in FIGS. 14, 15, and 17-19A/B. The tab member 46 may be fabricated of any suitably resilient material, including molded polymer, as seen in FIG. 2 and others, or metal as seen in FIG. 14 and others. Moreover the mounting aperture 48 may include an aperture reinforcement member 52, as is shown in FIGS. 2-12, or may lack such a feature as is shown in FIGS. 13-15, and 17-19A/B as may be desired by the specific application. Further, a tab member 46A may be used without a clamp member 16, as is shown in FIGS. 16A and 16B, wherein the tab member 46A includes a tab slot 90 to receive a cable tie 74.

Figure 13:
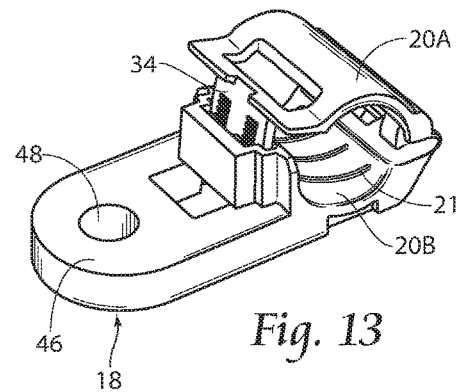
FIG. 13 is a perspective view of an assembly, similar to that shown in FIG. 9, but showing a fastening tab having a non-reinforced opening.
Figure 14:
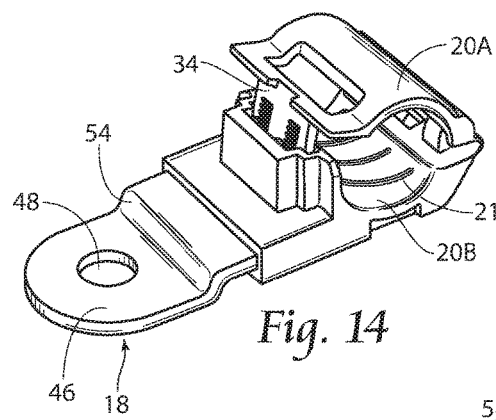
FIG. 14 is a perspective view of an assembly, similar to that shown in FIG. 13, but showing a metal fastening tab.
Figure 14A:
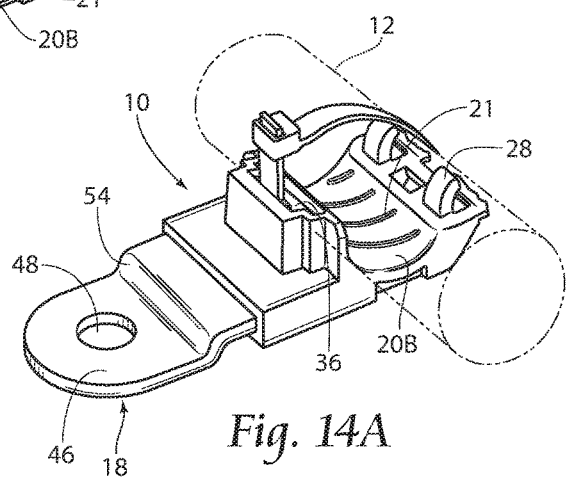
FIG. 14A is a perspective view of the assembly illustrated in FIG. 14, but showing a cable tie in use to secure an elongate object after clamp failure.
Figure 15:
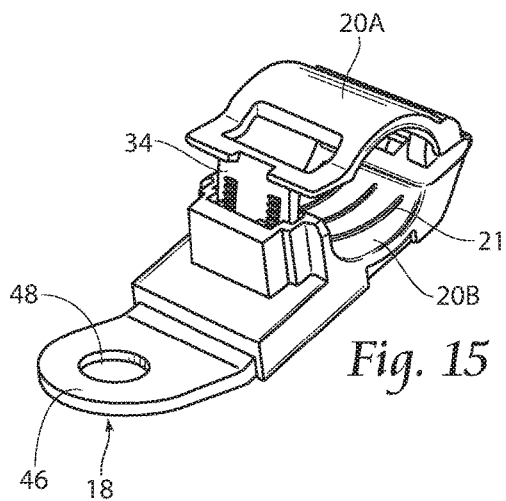
FIG. 15 is a perspective view of an assembly, similar to that shown in FIGS. 13 and 14, but showing a fastening tab having an angled portion.

As may be seen in FIGS. 13-19A/B, the tab member 46, 46A may assume various shapes and configurations and remain within the scope of the present invention. As illustrated, the tab member 46 may extend laterally in a generally planar arrangement (see FIG. 13), may include a stepped portion 54 (see FIG. 14), or may extend at an angle (see FIG. 15). Moreover, the tab member 46 may include an extension portion 56 (see FIGS. 17 and 18) having a predetermined length. The length of the extension portion 56 may vary according the requirements of a specific application. Moreover, the tab member 46 may be integrally formed as a one piece construction with the assembly 10, as seen in FIG. 13, may be overmolded as is shown in FIGS. 14, and 17-19A/B, or may be a unitary piece without a clamp member 16 as shown in FIGS. 16A and 16B.

With reference now to FIGS. 21-24, the present clamp assembly 10 may be seen in use in combination with a tension tab 62. A tension tab 62 for use with the present assembly 10 may comprise an elongate strap portion 64 and a head portion 66. A tension tab 62 may be used to aid a user in closing the arcuate members 20A, 20B around an elongate bundle 12 and to apply proper tension of the arcuate members 20A, 20B around the elongate member 12. In use, and as seen in FIG. 24, the tension tab 62 is inserted in a tension tab aperture 68 on the assembly 10. The head portion 66 is stopped against an abutment 70 in the tension tab aperture 68, while the strap portion 64 extends from the tension tab aperture 68 (see FIG. 24). To close the arcuate members 20A, 20B around the elongate object 12, the user may press down on the first arcuate member 20A to move the tongue 34 into the slot opening 36, or, when the tension tab 62 is used, the user may use a handheld tensioning device 72 to grasp the tension tab strap 64. When the tension tab 62 and handheld tensioning device 72 are used as shown in FIG. 24, the handheld device 72 is actuated to pull the tension tab strap 64 in the direction of arrow A, while pushing against the first arcuate member 20A in the direction of arrow B to thereby close the arcuate members 20A, 20B with a predetermined tension. Once closed to the predetermined tension, the handheld device 72 may sever the excess portion of the tension tab strap portion 64. The present assembly 10 may be further used on combination with a flexible cable tie 74 (see FIG. 20) such as are widely used in other applications to secure elongate items, such as wires, cables, hoses and tubes, into compact, secure bundles, as will be discussed.

Figure 25:
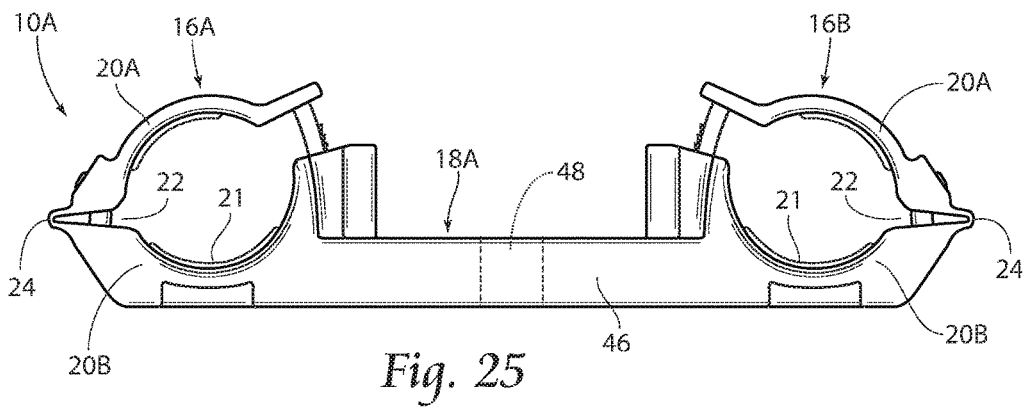
FIG. 25 is a side elevation view of another embodiment of an assembly and showing two p-clamps joined by a single fastening tab.
Figure 26:
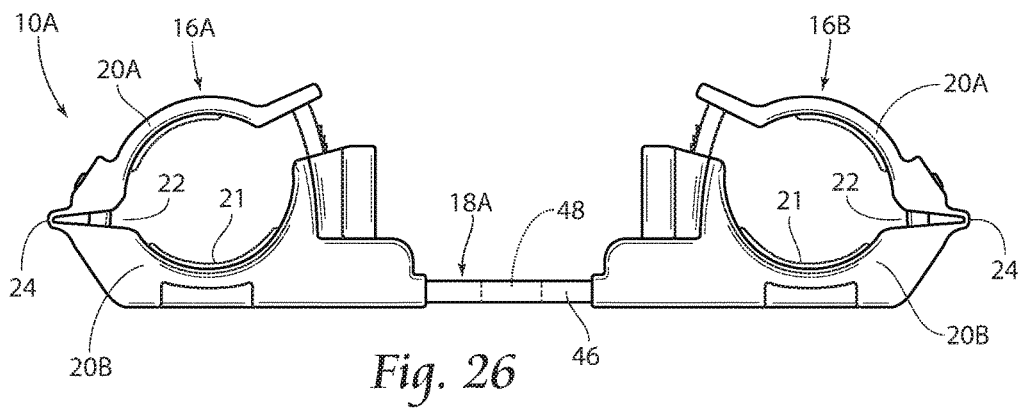
FIG. 26 is a view similar to that of FIG. 25 but showing two p-clamps joined by a metal fastening tab.

The views of FIGS. 25 and 26 illustrate an alternative embodiment clamp assembly 10A, in which a pair of clamp members 16A, 16B may be laterally spaced apart and joined by a mount element 18A. As in the previously described embodiment, the assembly 10A of these views includes two principal components, a pair integrally formed clamp members 16A, 16B and a mount element 18A. The clamp members 16A, 16B each include a pair of substantially symmetrical, locking arcuate members 20A, 20B that are shaped and dimensioned to encircle an elongate bundle 12 and are joined by a hinge mechanism 22. The arcuate members 20A, 20B may further include ridges 21 or, alternatively, the arcuate members 20A, 20B may include a cradle member 58, as described with reference to FIGS. 10-11. As in the previously described embodiment, the hinge mechanism 22 may include an area of reduced thickness 24 to allow the hinge mechanism 22 to move freely during the installation and securing of an elongate article 12. The assembly 10A illustrated in these views further includes the hinge interlocking mechanism 26 previously discussed as comprises at least one arcuate projection 28 that is configured to be received into a corresponding channel 30 (not shown in these views). Moreover, the clamp assembly 10A illustrated in FIGS. 25 and 26 includes a mounting element 18A for securing clamp-restrained elongated articles or bundles 12 to a support structure 14 (see FIGS. 27-38). As in the previous embodiment, the mounting element 18A includes an extending tab mount member 46 having a mounting aperture 48 therein which may or may not include an aperture reinforcement member 52. The tab member 46 may be integrally formed with the clamp assembly 10A, as is shown in FIG. 25 or may be over molded with the clamp assembly 10A as depicted in FIG. 26.

Figure 32:
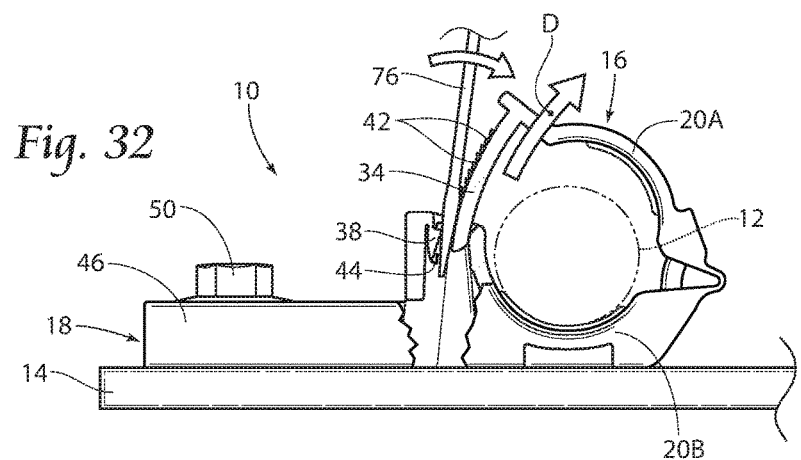
FIG. 32 is a view similar to that of FIG. 31 but showing a tool releasing the locking mechanism to open the p-clamp.
Figures 33A, 33B:
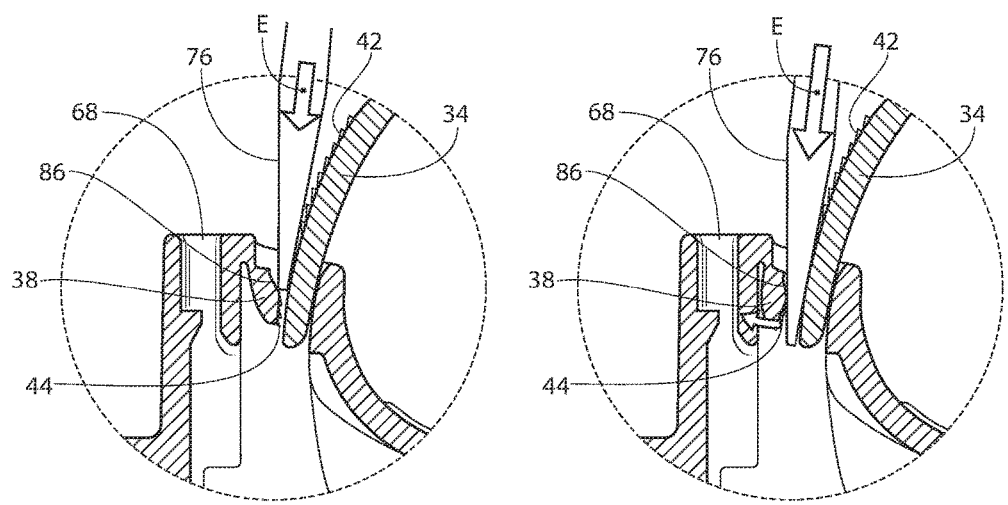
FIGS. 33A and 33B are enlarged views showing a portion of FIG. 32 with a tool releasing the locking mechanism to open the p-clamp.

A method of using the described assembly 10 according to the present invention may be seen in FIGS. 27-33B. As is shown, the mounting element 18 of the assembly 10 is secured to a support structure 14 by way of the bolt 50 shown, although it is to be understood that other attachment means may be used to attach the clamp assembly 10 to a primary supporting structure 14, such as screws, or other known devices. A bundle 12 is placed on arcuate member 20B and arcuate member 20A is moved in the direction of arrow C (see FIG. 29). As arcuate member 20A moves around bundle 12, the tongue 34 and its serrations 42, are engaged by the pawl 38 in the slot opening 36 until a proper tension is achieved and the bundle 12 is secured. In the event that release of the bundle 12 is desired, an elongate tool 76 is inserted into the slot opening 36, as shown in FIGS. 32-33B. The tool 76 biases the pawl 38 such the teeth 44 on the pawl 38 disengage from the serrations 42 of the tongue 34, and the tongue 34 may be released in the direction of arrow D, thereby opening the clamp member 16 and freeing the bundle 12. Moreover, the views of FIGS. 33A and 33B illustrate the pawl 38 having a wedge release aid 86 to further aid a user in release of the tongue 34. As shown, a tool 76 moves in the direction of arrow E and biases the wedge 86 for release of the tongue 34 in the direction of arrow D (see FIG. 32).

Figure 34:
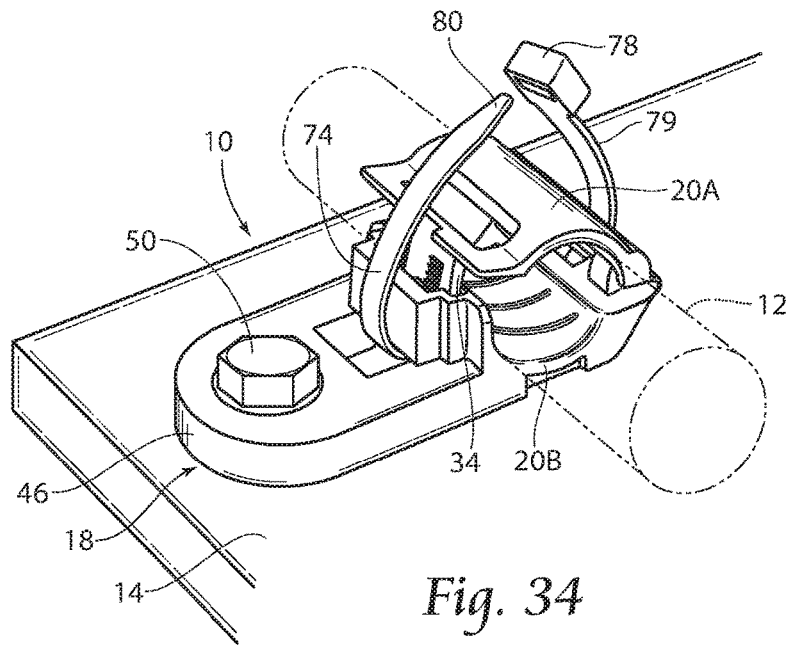
FIG. 34 is a view similar to that of FIG. 30, but showing a cable tie being positioned around the p-clamp.
Figure 35:
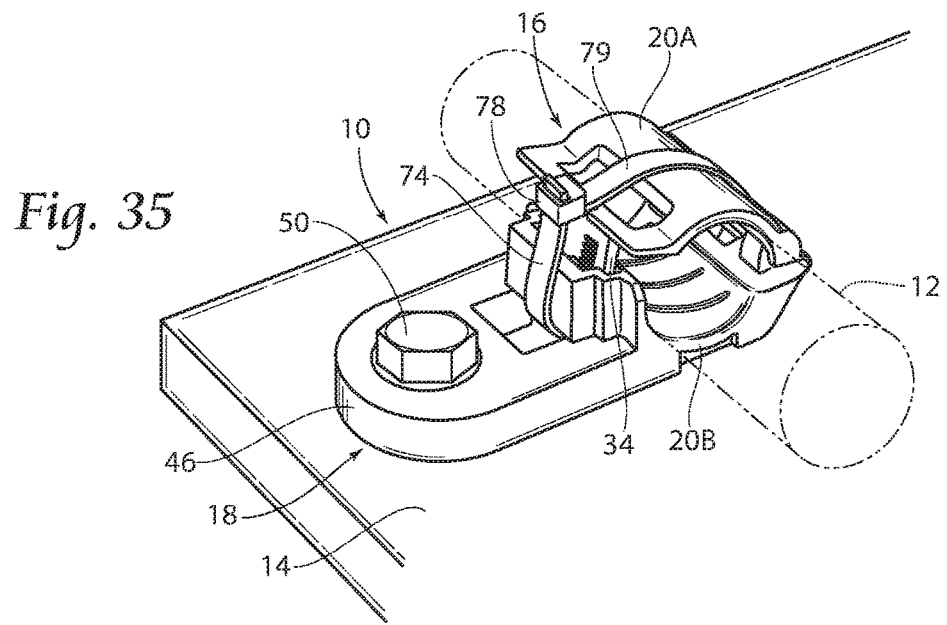
FIG. 35 is a view similar to that of FIG. 34, but showing a cable tie in place and securing the p-clamp around an elongate object.
Figure 35A:
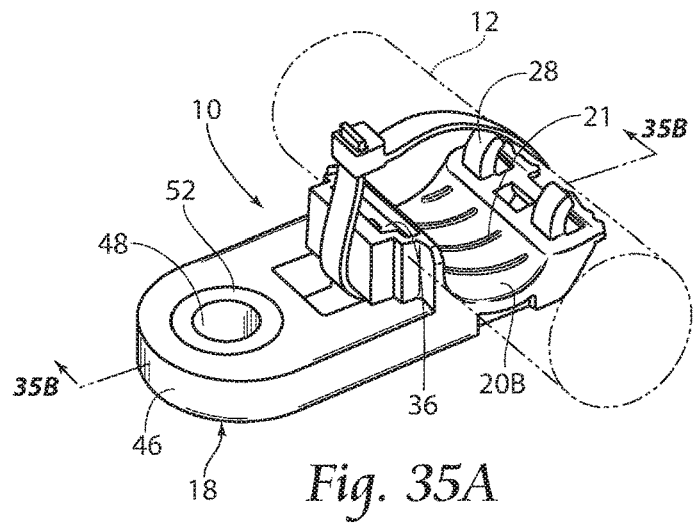
FIG. 35A is a perspective view of an assembly, similar to that shown in FIG. 35, but showing a cable tie in use to secure an elongate object during clamp failure.
Figure 35B:
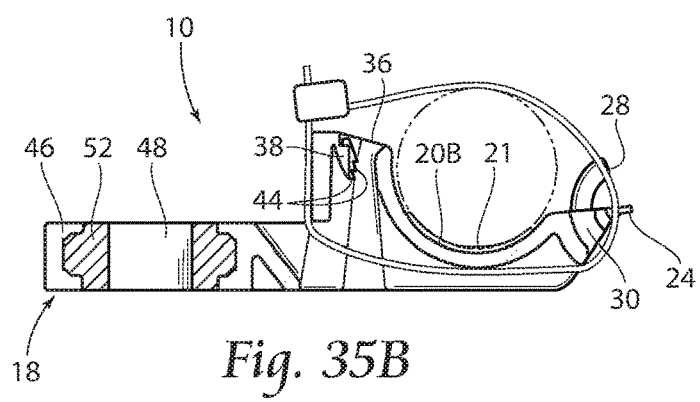
FIG. 35B is a cross section view of the assembly illustrated in FIG. 35A and taken along line 35B-35B thereof.
Figure 36:
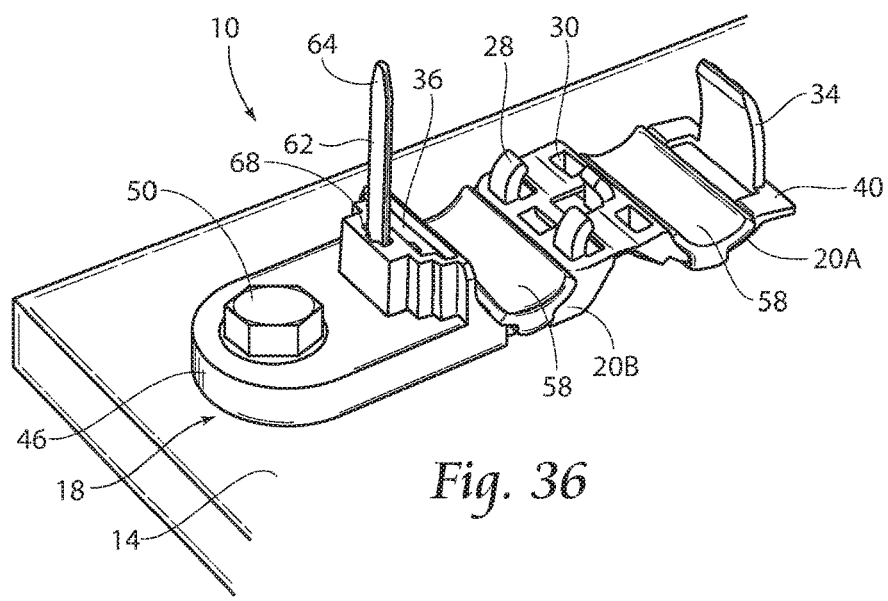
FIG. 36 is a view similar to that of FIG. 22, but showing the assembly secured to a support surface and with a tension tab in place in the tension tab mount.
Figure 37:
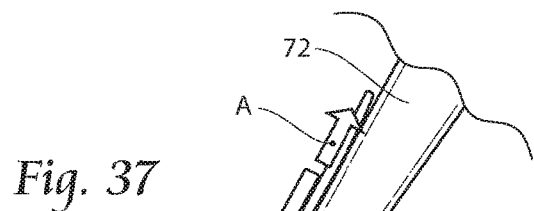
FIG. 37 is a side elevation view of the assembly illustrated in FIG. 36 and showing the tension tab being tightened by a hand held device.
Figure 38:
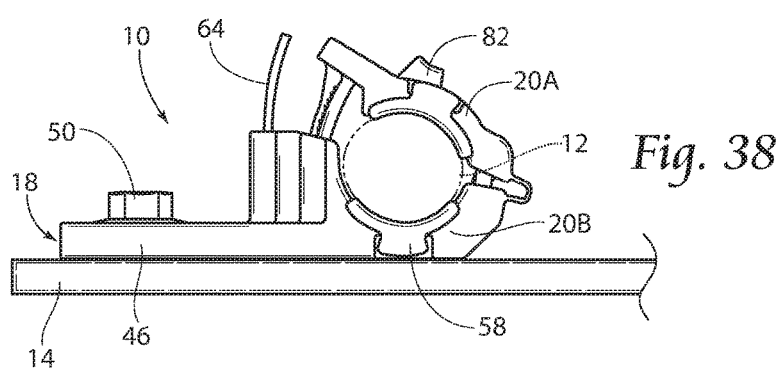
FIG. 38 is a view of the assembly illustrated in FIG. 37 but with the tension tab fully tightened, the p-clamp secured around an elongate object, and the tension tab tail severed.
Figure 39:
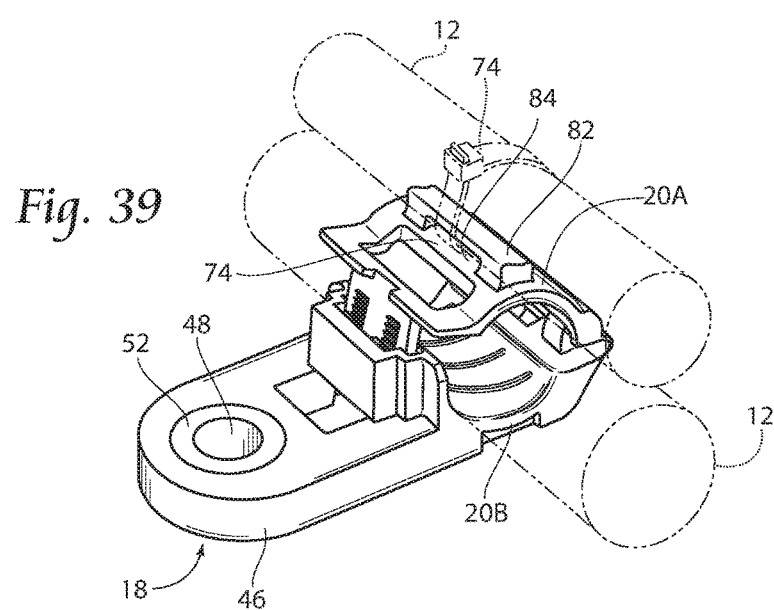
FIG. 39 is a perspective view of an assembly similar to that illustrated in FIG. 8, but showing a second bundle attached to a saddle mount.

FIGS. 34 and 35 illustrate another method of using the described assembly 10 according to the present invention. As is shown, and similar to the method of FIGS. 28-31, the mounting element 18 is secured to a support structure 14 by way of a bolt 50 or other suitable device. A bundle 12 is placed on arcuate member 20B and arcuate member 20A is moved as shown in FIG. 29 such that the tongue 34 and its serrations 42 are engaged by the pawl 38 in the slot opening 36 until a proper tension is achieved and the bundle 12 is secured. The method shown in FIGS. 34 and 35 may include the further step of retaining the clamp member 16 with a cable tie 74. Typically, such ties 74 include a head 78 and a flexible strap 79, which terminates in a tail 80. In use, the tie 74 is inserted through the head 78 and then looped around the elongate item, in this use the clamp member 16. The tail 80 is then pulled tight to pull the strap 79 around the clamp member 16 to thereby secure the clamp member 16 in a closed position. A pawl mechanism (not shown) within the head 78 secures the strap 79 against withdrawal. The use of the cable tie 74 further secures the clamp 16 in closed condition the event of a failure or other unwanted release of the clamp 16 (see FIGS. 35A and 35B).

Another method of using the described assembly 10 and utilizing a tension tab 62 may be seen in the views of FIGS. 36-39. A tension tab 62, as previously described, may comprise an elongate strap portion 64 and a head portion 66 (not shown). A tension tab 62 may be used to aid a user in closing the arcuate members 20A, 20B around an elongate bundle 12 and to apply proper, accurate tensioning of the arcuate members 20A, 20B around the elongate member 12. As is shown, and similar to the methods of FIGS. 28-33B and 34-35B, the mounting element 18 is secured to a support structure 14 by way of a bolt 50. A bundle 12 is placed on arcuate member 20B and the tension tab 62 is inserted in a tension tab aperture 68 on the assembly 10. The head portion 66 is stopped against an abutment 70 in the tension tab aperture 68 (see FIG. 24), while the strap portion 64 extends from the tension tab aperture 68. A handheld tensioning device 72 grasps the tension tab strap 64 and the handheld device 72 is actuated to pull the tension tab strap 64 in the direction of arrow A (see also FIG. 24). The device 72 pushes against the first arcuate member 20A in the direction of arrow B to thereby close the arcuate members 20A, 20B with a predetermined tension such that the tongue 34 and its serrations 42 are engaged by the pawl 38 in the slot opening 36 until a proper tension is achieved and the bundle 12 is secured.

As may further be seen in these views, an assembly 10 according to the present invention may be provided with a saddle mount 82. With particular attention to FIG. 39, a saddle mount 82 may be seen attached to arcuate member 20A and including a tie slot 84. The saddle mount 82 may support a bundle 12 which is secured by a cable tie 74. As shown, the cable tie 74 encircles the bundle 12, is received by the tie slot 84, and thereby attaches the bundle 12 to the saddle mount 82. It is to be understood that while a saddle mount 82 is shown in conjunction with the assembly 10 illustrated in FIGS. 37-39, assemblies 10, 10A depicted in other FIGS. may also include a saddle mount 82.

Figure 40:
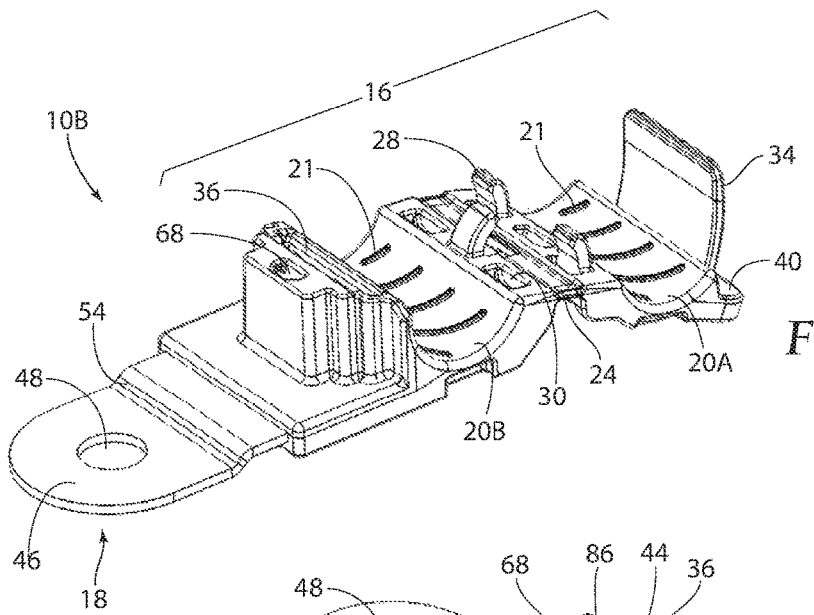
FIG. 40 is a is a perspective view of an assembly, similar to that of FIG. 2, but having a metal fastening tab in combination with a tension tab aperture.
Figure 41:
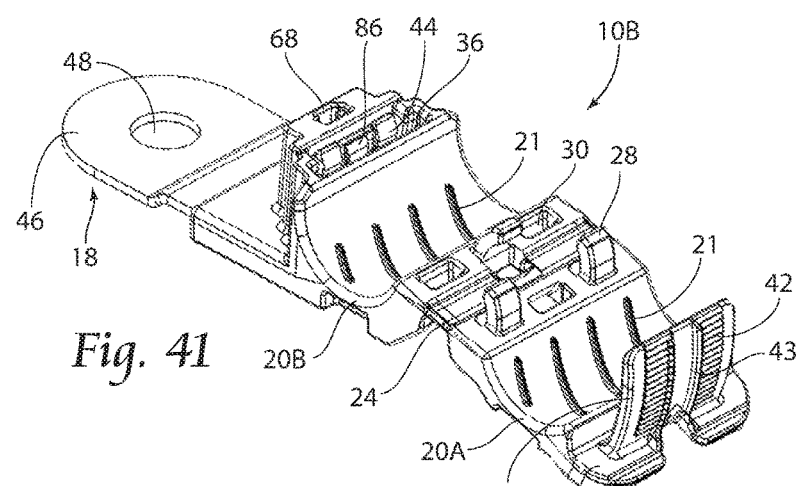
FIG. 41 is another perspective view of the assembly illustrated in FIG. 40.
Figure 42:
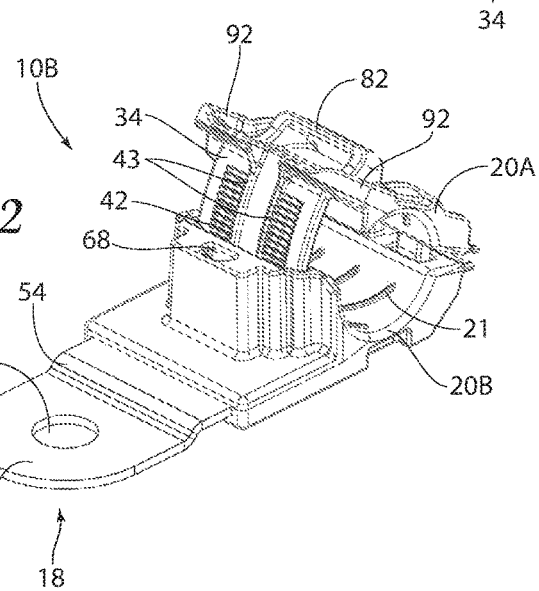
FIG. 42 is another perspective view of the assembly illustrated in FIGS. 40 and 41, but showing the p-clamp in a closed position.

The views of FIGS. 40-42 illustrate another embodiment of an assembly 10B according to the present invention which combines previously described features. As in other described embodiments, the assembly 10B of these views includes an integrally formed clamp member 16 and a mount element 18, the clamp member 16 having a pair of substantially symmetrical, locking arcuate members 20A, 20B. As shown, the arcuate members 20A, 20B may further include ridges 21 to aid in securing a bundle 12 (not shown in these views) within the clamp member 16 and help prevent unwanted rotation of the bundle 12 during vibration or other movement of the assembly 10B. As with the previous embodiment, although not shown, the assembly 10B of these views may include a cradle member 58. Moreover, a hinge mechanism 22 may include an area of reduced thickness 24 to allow the hinge mechanism 22 to move freely during the installation and securing of an elongate article 12. As further shown, and as also described in previous embodiments, the hinge mechanism 22 may include a hinge interlocking mechanism 26 in which at least one arcuate projection 28 is configured for reception into a corresponding channel 30.

The embodiment illustrated in FIGS. 40-42 further includes a lock mechanism 32 similar to that of previous embodiments, wherein the lock mechanism 32 is comprised of a tongue 34 and a slot opening 36 having an engaging pawl 38. The pawl 38 may include a wedge release 86 as was described with reference to FIGS. 33A, 33B. As shown, the distal end 40 of a first arcuate member 20A may include an extending tongue member 34, with a slot opening 36 being positioned adjacent a second arcuate member 20B. The tongue member 34 is preferably molded with a plurality of serrations 42, which extend along the length of the tongue 34 and across the width of the tongue 34. The serrations 42 may be arranged in two parallel rows as shown, with the wedge release 86 positioned between the rows of serrations 42. As previously mentioned, the tongue member 34 is adapted to be received in a corresponding slotted opening 36 adjacent the second arcuate member 20B. The wedge-shaped pawl 38 located in the slotted opening 36 may include teeth 44 arranged in two parallel rows to correspond to the width of the serrations 42 on the tongue member 34. As in previous embodiments, the serrations 42 engage the teeth 44 on the wedge shaped pawl 38 when the tongue member 34 is inserted into the slot opening 36 for locking. The tongue member 34 may further include a pair of spaced apart serration rails 43 to minimize damage to the serrations 42 by a release tool 76 (see FIGS. 32, 33A, 33B), should opening of the lock mechanism 32 be desired. The tongue member 34 may be reinforced by way of the flanges 92 illustrated. The flanges 92 reduce twisting or buckling of the tongue member 34 in use. As illustrated, the tab member 46 of the embodiment shown may be overmolded.

Figure 43:
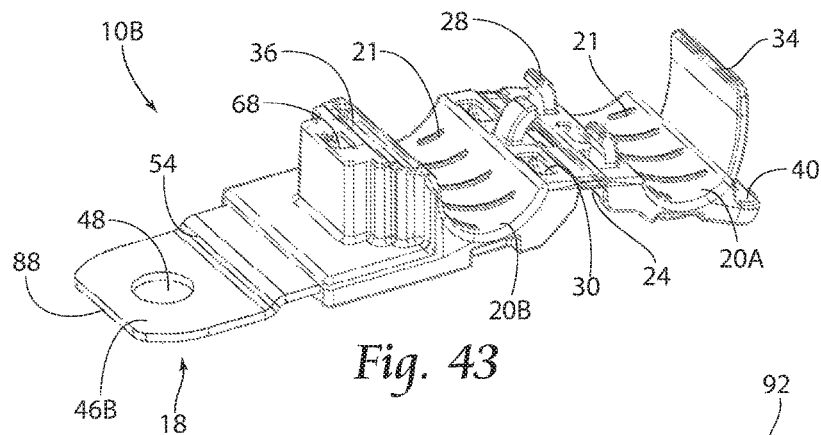
FIG. 43 is a perspective view of an alternative assembly, similar to that shown in FIG. 40, but having a metal fastening tab with flattened portions.
Figure 44:
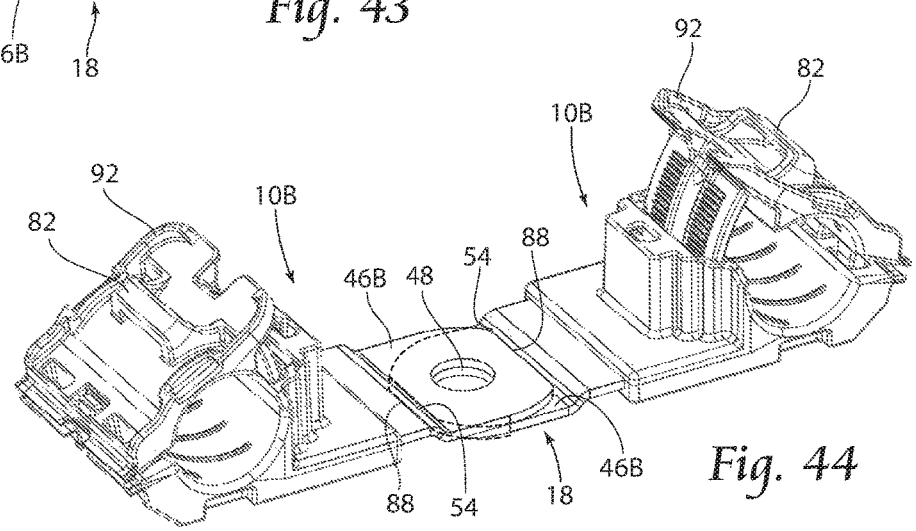
FIG. 44 is a perspective view showing two assemblies as illustrated in FIG. 43 with the flattened portions of metal fastening tabs nested against stepped portions.
Figure 45:
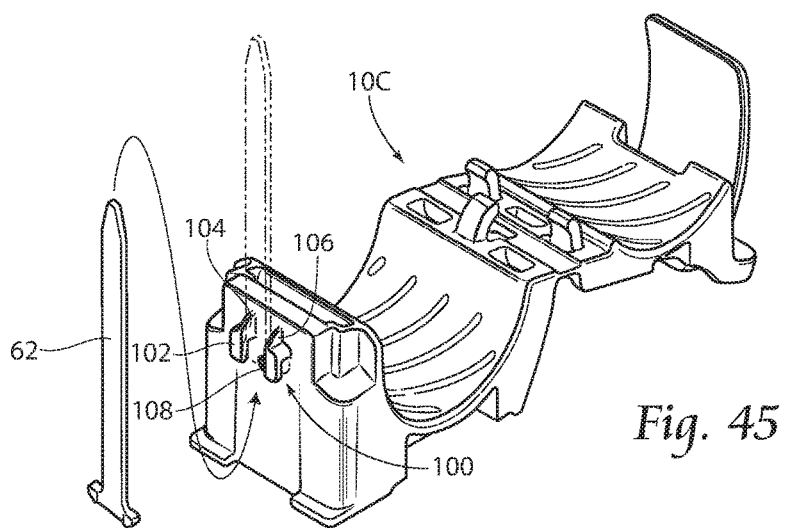
FIG. 45 is a perspective view of an alternate assembly and showing a tension tab lock and a tension tab in place for use.

FIGS. 43 and 44 illustrate a variation of assembly 10B featured in FIGS. 40-42. The assembly of these views includes an overmolded tab member 46B having flattened profile portions 88. The flattened portions 88 allow nesting of two assembles 10B, as is illustrated in FIG. 43. As shown, the flattened portions 88 of the metal tabs 46B nest against stepped portions 54 of a corresponding assembly 10B, thereby allowing facile use of multiple adjacent assemblies 10B.

The embodiment in FIGS. 45-48 illustrates an alternative clamp assembly 10C featuring a variation of the tension tab mount 100 as featured in all previous embodiments. The tab mount 100 is comprised of a plurality of substantially symmetrical tab mount flanges 102 having an inner face 104 and an outer face 106. The flanges 102 are spaced apart the approximately the width of the tension tab 62. To mount the tab 62, the user glidingly inserts the tension tab 62 in between the tab mount flanges 102 tangentially contacting the inner faces 104. And the tension tab 62 is locked in place by the tab securing wedge 108. To dismount, the user applies pressure to the outer face 106 and the securing wedge 108 to dislodge the tab 62.

Regarding FIGS. 47, 48 and 53-54, the illustrated embodiment features a clamp mounting attachment 110 for purposes of mounting the assembly on a surface using an adhesive pad 124 and adhesive surface 116. The mounting attachment 110 is horizontally guided into the mounting insert channel 130 of the assembly, wherein the upper service 112 of the attachment 110 is glided and frictionally engages with the upper channel surface 130A; the substantially symmetrical and mirrored channel wings 132 frictionally engage with the mounting attachment's groove surface 122 and mid surface 118 to keep the attachment 110 in guided position within the channel 130. The curved wedge clip face 120A is guided under the channel wedge 126 and the wedge clip 120 is secured on the outer face of the wedge clip 126A.

Figure 51:
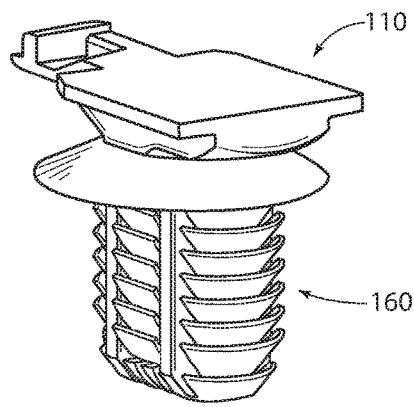
FIG. 51 is a perspective view of a variation of the mounting insert as illustrated in FIG. 48, configured with a mounting oval fir tree.
Figure 52:
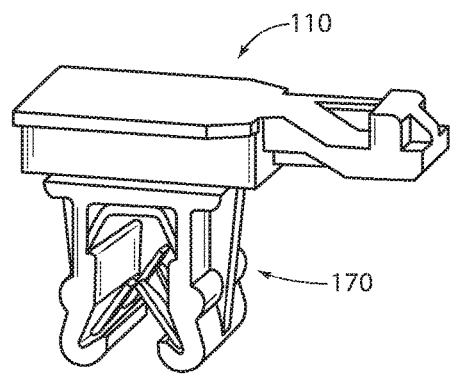
FIG. 52 is a perspective view of a variation of the mounting insert as illustrated in FIG. 48, configured with a mounting edge clip.
Figure 53:
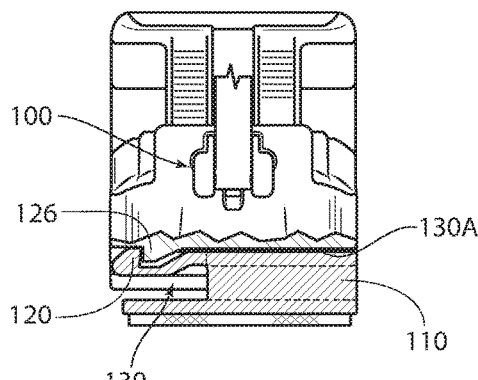
FIG. 53 is a front elevation view of an assembly as illustrated in FIGS. 45-48 and showing a partial sectional view of the mounting insert positioned in the mounting channel.
Figure 54:
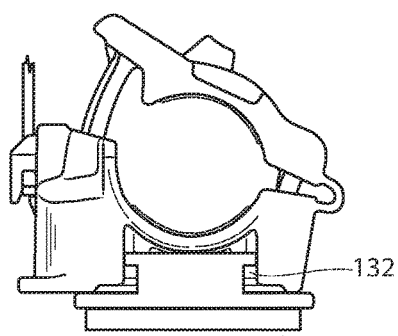
FIG. 54 is a side elevation view of an assembly as illustrated in FIGS. 45-48 showing the mounting insert positioned in the mounting channel.

FIGS. 49-52 feature multiple configurations of the clamp mounting attachment 110 to be used with various mounting approaches. FIG. 49 illustrates the mounting configured with a mounting arrowhead 140. FIG. 50 illustrates the mounting attachment configured with a mounting fir tree 150. FIG. 51 illustrates the mounting attachment configured with a mounting oval fir tree 160. FIG. 52 illustrates the mounting attachment configured with a mounting edge clip 170.

Figure 55A:
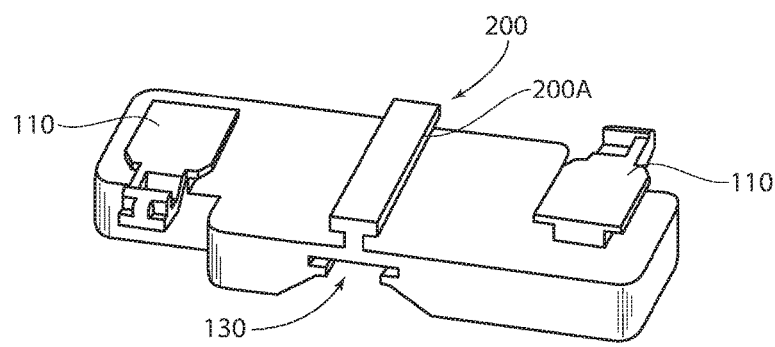
FIG. 55A is a perspective view of variation of a mounting assembly having two mounting inserts as illustrated in FIG. 48.
Figure 55B:
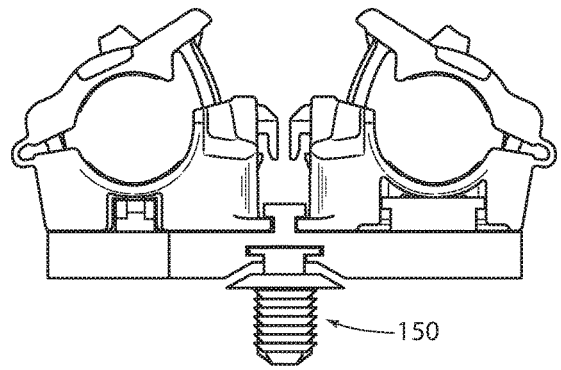
FIG. 55B is a front view of FIG. 55A, showing two assemblies as illustrated in FIG. 45 affixed with the mounting inserts positioned in the mounting channels.

FIGS. 55A and 55B illustrate another variation of the clamp mounting assembly. The assembly of these views includes a groove member 200 having an elevated lip member 200A. The elevated lip member 200A allow the outer lips of the assembly 10C to nestle into the grooves of the groove member 200, thereby allowing facile use of multiple adjacent assemblies 10C.

Figure 56A:
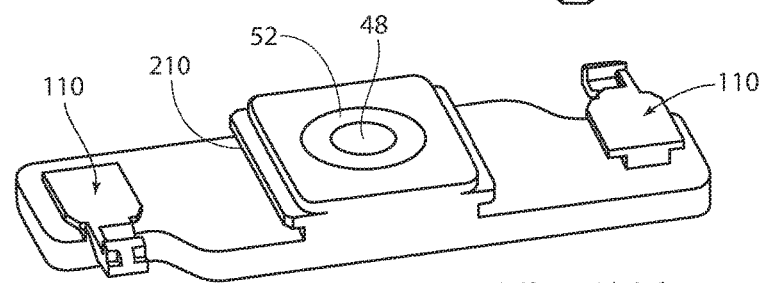
FIG. 56A is a perspective view of a variation of the mounting assembly as illustrated in FIG. 55A, having a mounting aperture sized and dimensioned to receive attachment means, such as a bolt.
Figure 56B:
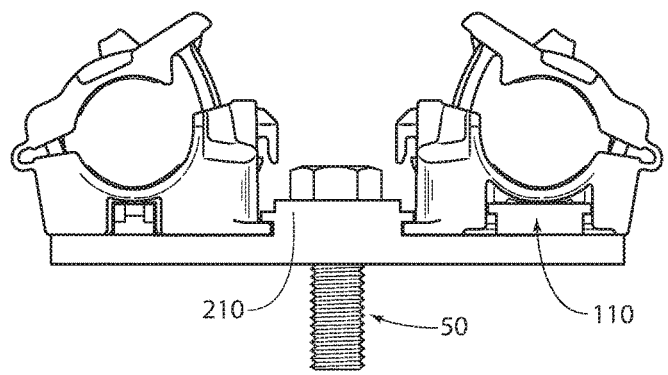
FIG. 56B is a front view of FIG. 56A, showing two assemblies as illustrated in FIG. 45 affixed with the mounting inserts positioned in the mounting channels and a bolt positioned in the mounting aperture.

FIGS. 56A-56B and 58 illustrate another variation of the clamp mounting assembly. The assembly of these views includes a molded lip member 210 allowing for the outer lips of the assembly 10C to nestle into the grooves of the molded lip member 210, thereby-allowing facile use of multiple adjacent assemblies 10C. The lip member 210 is formed to house a mounting aperture 48 sized and dimensioned to receive attachment means, such as a bolt 52.

Figure 57A:
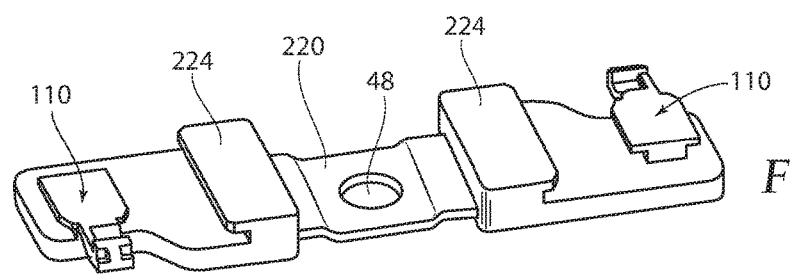
FIG. 57A is a perspective view of a variation of a mounting assembly having two mounting inserts as illustrated in FIGS. 56A-56B, having a mounting aperture sized and dimensioned to receive attachment means, such as a bolt.

FIGS. 57A-57B and 59 illustrate another variation of the clamp mounting assembly. The assembly of these views includes a tab member 220 and mirrored lip wings 224. The lip wings 224 allow the outer lips of the assembly 10C to nestle under the grooves to lock maintain firm position on the assembly, as is illustrated in FIG. 57B. As shown, the tab member 220 lip member 210 is formed to house a mounting aperture 48 sized and dimensioned to receive attachment means, such as a bolt 52.

FIGS. 60-61 illustrate clamp assembly 10C also having mounting element 18 for securing clamp-restrained elongated articles or bundles 12 to a support structure 14.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A clamp assembly for securing an elongate member, said clamping member comprising:
an integrally formed clamp member and a mount element; said clamp member having a first and a second curved member, said first and second curved members being substantially symmetrical, shaped to enclose the elongate member and separated by a hinge mechanism; said hinge mechanism having at least one curved projection configured to be releasably received by a corresponding channel and having an area of reduced thickness therebetween;
a locking mechanism having a tongue member and a slotted opening, said tongue member being configured to be releasably received in said slotted opening, positioned on the distal end of the first curved member and the slotted opening positioned adjacent the second curved member, wherein said tongue member has a plurality of serrations arranged in two parallel rows extending along a length of the tongue and across a width of the tongue; and
a wedge-shaped pawl having a plurality of teeth arranged in two parallel rows located in the slotted opening, said teeth configured to engage with the serrations when the tongue member is inserted into the slotted opening, said pawl further comprising a release wedge disposed between the two parallel rows of teeth in the plurality of teeth configured to disengage the plurality of teeth from the plurality of serrations.

2. The clamp assembly according to claim 1, wherein said mount element has a mounting aperture configured to receive attachment means thereto.

3. The clamp assembly according to claim 2, wherein the mount element mounting aperture is configured to receive a fastener.

4. The clamp assembly according to claim 3, wherein the mount element mounting aperture further includes an aperture reinforcement member about the aperture.

5. The clamp assembly according to claim 1, wherein the mount element is over molded with the clamp member.

6. The clamp assembly according to claim 1, wherein the mount element is configured to be positioned at an angled alignment in relation to the clamp member.

7. The clamp assembly according to claim 1, wherein the mount element further comprises an adhesive.

8. The clamp assembly according to claim 1, further comprising at least one cradle member positioned between one of said curved members and said elongate member.

9. The clamp assembly according to claim 1, wherein said tongue member further comprises a pair of spaced apart serration rails disposed intermediate the two parallel rows of serrations in the plurality of serrations, said serration rails configured to minimize damage to the plurality of serrations from a release tool engaging the wedge release.

\* \* \* \* \*